US012586875B2

(12) United States Patent
Gaben et al.

(10) Patent No.: US 12,586,875 B2
(45) Date of Patent: Mar. 24, 2026

(54) METHOD FOR PRODUCING LITHIUM-ION BATTERIES, IN PARTICULAR HIGH-POWER BATTERIES, AND BATTERY OBTAINED BY THIS METHOD

(71) Applicant: I-TEN, Dardilly (FR)

(72) Inventors: Fabien Gaben, Dardilly (FR); Ian Cayrefourcq, Villefontaine (FR); David Gruet, Lyons (FR)

(73) Assignee: I-TEN, Dardilly (FR)

( * ) Notice: Subject to any disclaimer, the term of this patent is extended or adjusted under 35 U.S.C. 154(b) by 944 days.

(21) Appl. No.: 17/788,379

(22) PCT Filed: Dec. 23, 2020

(86) PCT No.: PCT/IB2020/062399
§ 371 (c)(1),
(2) Date: Jun. 23, 2022

(87) PCT Pub. No.: WO2021/130697
PCT Pub. Date: Jul. 1, 2021

(65) Prior Publication Data
US 2023/0076672 A1 Mar. 9, 2023

(30) Foreign Application Priority Data

| Dec. 24, 2019 | (FR) | ....................................... | 1915529 |
| Dec. 24, 2019 | (FR) | ....................................... | 1915566 |
| Jan. 23, 2020 | (FR) | ....................................... | 2000677 |
| May 20, 2020 | (FR) | ....................................... | 2005140 |

(51) Int. Cl.
$H01M\ 50/54$ (2021.01)
$H01M\ 4/04$ (2006.01)
$H01M\ 10/0568$ (2010.01)
$H01M\ 50/16$ (2021.01)
$H01M\ 50/519$ (2021.01)
$H01M\ 50/534$ (2021.01)
$H01M\ 50/562$ (2021.01)

(52) U.S. Cl.
CPC ......... H01M 50/54 (2021.01); H01M 4/0404 (2013.01); H01M 10/0568 (2013.01); H01M 50/16 (2021.01); H01M 50/519 (2021.01); H01M 50/534 (2021.01); H01M 50/562 (2021.01)

(58) Field of Classification Search
CPC .. H01M 50/54; H01M 50/519; H01M 50/534; H01M 50/16; H01M 50/562; H01M 4/0404; H01M 10/0568
See application file for complete search history.

(56) References Cited

U.S. PATENT DOCUMENTS

| 2012/0045685 A1 | 2/2012 | Seki et al. |
| 2013/0122350 A1 | 5/2013 | Hagiwara et al. |
| 2016/0013513 A1 | 1/2016 | Gaben |

FOREIGN PATENT DOCUMENTS

| CN | 110073514 A | 7/2019 |
| FR | 3068830 A1 | 11/2019 |
| TW | 201931664 A | 8/2019 |
| WO | 2019215410 A1 | 11/2019 |

*Primary Examiner* — Nathanael T Zemui
(74) *Attorney, Agent, or Firm* — Jordan IP Law, LLC; Todd A. Vaughn

(57) ABSTRACT

High-power battery architecture comprising unique anode and cathode conductive means procuring improved battery life.

20 Claims, 16 Drawing Sheets

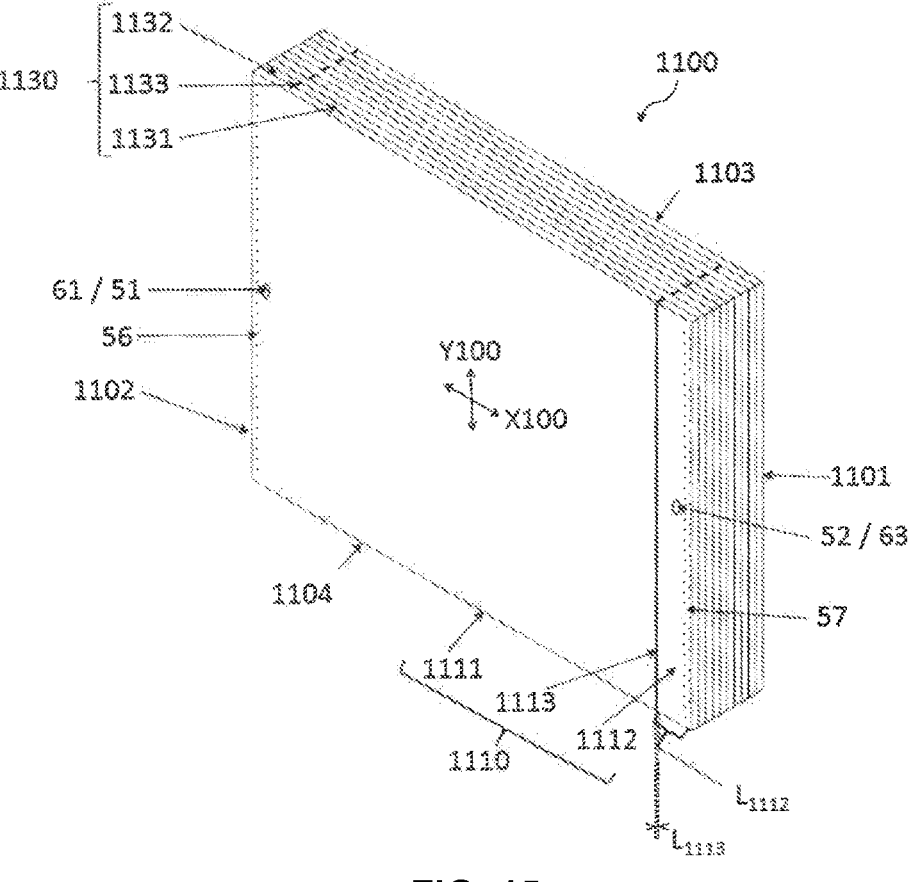
FIG. 15
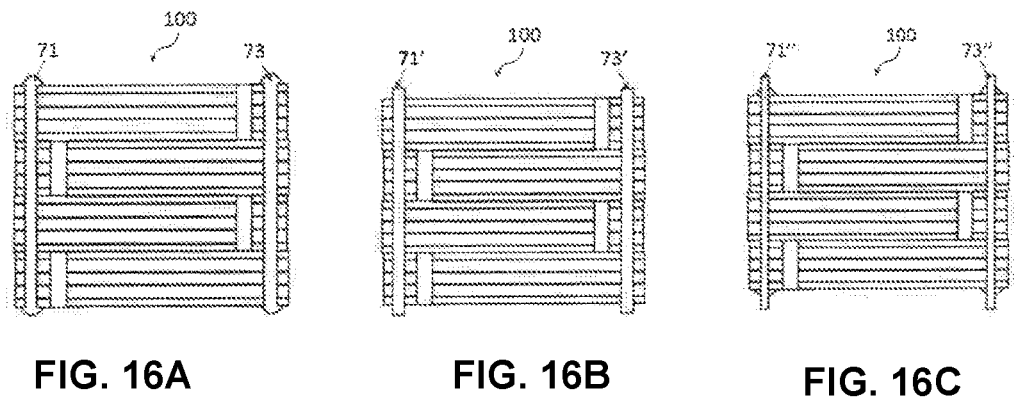
FIG. 16A          FIG. 16B          FIG. 16C

METHOD FOR PRODUCING LITHIUM-ION BATTERIES, IN PARTICULAR HIGH-POWER BATTERIES, AND BATTERY OBTAINED BY THIS METHOD

CROSS-REFERENCE TO RELATED APPLICATIONS

The present application is a National Stage Application of PCT International Application No. PCT/IB2020/062399 (filed on Dec. 23, 2020), under 35 U.S.C. § 371, which claims priority to French Patent Application No. 1915529 (filed on Dec. 24, 2019), French Patent Application No. 1915566 (filed on Dec. 24, 2019), French Patent Application No. 2000677 (filed on Jan. 23, 2020), and French Patent Application No. 2005140 (filed on May 20, 2020) which are each hereby incorporated by reference in their complete respective entireties.

TECHNICAL FIELD

The present invention relates to the manufacture of lithium-ion batteries. The invention relates to a novel method for manufacturing batteries, and in particular high-power lithium-ion batteries. It further relates to the batteries obtained by this method, which have a novel architecture giving them a longer life.

BACKGROUND

In order to increase the production output for rechargeable batteries with a high energy density and a high power density, such as solid-state batteries or batteries impregnated with a liquid electrolyte, the simultaneous manufacture of a plurality of batteries can be achieved by superimposing alternating anode and cathode foils previously coated with an electrolyte layer.

International Patent Publication No. WO 2016/001584 (I-TEN) describes foils comprising a conductive substrate covered successively with an electrode layer covered with an electrolyte layer; these foils are cut, before or after deposition, in patterns, in particular in a U-shape. These foils are stacked alternately in order to form a stack of a plurality of unit cells. The anode and cathode cutting patterns are placed in a "head-to-tail" configuration so that the stacking of the cathode and anode layers is laterally offset. After the stacking step, this document discloses depositing a conformal thick-layer encapsulation system, typically a polymer layer, about ten microns thick, on the stack and in the available cavities present within the stack. This firstly ensures the stiffness of the structure at the cutting planes and secondly protects the battery cell from the atmosphere. Once the stack has been produced and is encapsulated in a stiff structure, it is cut along cutting planes to obtain unit batteries, with the cathode and anode connections of the batteries being exposed on each of the cutting planes. When these cuts are made, the encapsulation system can be torn off, resulting in a break in the battery's impervious seal. Terminations (i.e. electrical contacts) are also known to be added where these cathode and anode connections are apparent.

This prior art is explained herein in greater detail with reference to FIG. 12, which shows a lithium-ion battery structure described in International Patent Publication No. WO 2016/001584. The battery 200 comprises a plurality of anodes 230 and a plurality of cathodes 210, which are disposed alternately one below the other. Each anode and each cathode comprises a layer of a respective anode or cathode active material, referred to as an anode layer, or respectively a cathode layer. Moreover, a layer of an electrolyte material, not shown in FIG. 12, is sandwiched between the anode and the cathode, such that this electrolyte material separates two active layers facing one another. The thickness of the various layers that constitute them does not normally exceed 15 μm, and is often comprised between 2 μm and 8 μm. The battery has, on a first lateral edge 201, anode connections 230', situated one below the other. Moreover, on the opposite lateral edge 202, cathode connections 210' are provided, situated one below the other. The stacking of the anodes 230 and cathodes 210 is laterally offset. The cathode connections 210' are situated such that they project from the free face 230" of the anode. Similarly, on the opposite edge 201, the free face 210" of the cathode is set back from the free face of the anode on which anode connections 230' are subsequently deposited.

However, this known solution has certain drawbacks. More specifically, depending on the positioning of the electrodes, in particular the proximity of the edges of the electrodes for multi-layer batteries and the cleanness of the cuts, a leakage current can appear at the ends, typically in the form of a creeping short-circuit. It reduces battery performance, despite the use of an encapsulation system around the battery and near the cathode and anode connections. Moreover, an unsatisfactory deposition of the encapsulation system on the battery is occasionally observed, in particular on the edges of the battery at the spaces created by the lateral offsetting of the electrodes on the edges of the battery.

Moreover, since the respective anode and cathode terminations are set back from the adjacent respective anode and cathode layers, a large cut is required. Such a cut must thus be filled with an insulating material. Due to the large dimensions thereof, this cutting leads to a substantial loss of materials useful for producing the battery itself. Moreover, it requires the application of thick insulator layers in the available cavities present within the stack. A thick insulator can weaken the entire battery encapsulation system, because, when cutting, the encapsulation system deposited as a thick layer tends to become delaminated. The architecture according to the prior art thus has both technical and economic drawbacks.

Finally, in numerous applications, the resistance of the batteries must be reduced, which leads to a loss of power. For very high-power batteries according to the prior art, the resistance of the connecting elements significantly contributes to the resistance of the battery: a battery architecture that has the effect of increasing the resistance of the connecting elements would not be acceptable, even if it could be capable of solving some of the other problems listed hereinabove. In this respect, the connection between the connecting elements and the conductive surfaces of the battery intended to come into contact with said connecting elements has a contact resistance, which must be minimised. This connection can be made simply by adhesive bonding. To illustrate this with the aforementioned FIG. 12, a metal foil can be adhesively bonded onto the edges of the anodes 230' and cathodes 210', after encapsulation of the battery and lateral cutting, which exposes these edges. A good connection has a low electrical resistance, which must not degrade during the life of the battery.

However, the conductive glues that are often used to adhesively bond metal foils at the terminations usually have a high contact resistance, especially glues containing graphite. By contrast, excellent electrical conduction properties are known to be obtained with inks containing metallic nanoparticles or carbide or nitride nanoparticles. However, this low resistance is only achieved if these inks undergo heat treatment at a temperature that is sufficient to cause sintering of the conductive nanoparticles. As a general rule, a temperature of about 400° C. causes incomplete sintering, but such a temperature is far too high for batteries containing a liquid electrolyte.

Moreover, the density of the sintered inks is not high enough to make them impermeable to water vapour (this permeability is expressed by the Water Vapour Transmission Rate (hereafter referred to as WVTR); this is the case, for example, of the Métalon®-Nano Copper ink by Novacentrix®. There is thus a real need to improve the quality of the electrical contact between the conductive surfaces of the battery and the connecting elements, both to reduce contact resistance and to improve the durability of this electrical contact.

SUMMARY

The present invention aims to overcome, at least in part, some of the aforementioned drawbacks of the prior art.

It in particular aims to increase the production output for rechargeable batteries with a high energy density and a high power density and to produce more efficient encapsulations at a lower cost.

It in particular aims to propose a method that reduces the risk of a short-circuit, and that allows a battery with a low self-discharge rate to be manufactured.

It in particular aims to propose a method that allows a battery with a very long life to be manufactured in a simple, reliable and fast manner.

It further aims to propose such a method, which uses a higher-quality cutting step than that used in the prior art.

It further aims to propose such a method, which enhances the encapsulation phases and the encapsulation itself, which takes place during the production of the final battery.

It further aims to propose a method for manufacturing batteries that generates a smaller loss of material.

In any case, the solution to these problems must not increase the resistance of the battery, and must, where possible, reduce it.

At least one of the above purposes is achieved by means of at least one of the objects according to the invention as described hereinbelow. The respective objects proposed by the present invention relate to a battery, the manufacturing method thereof, an energy-consuming device and a battery according to another embodiment, these objects being set out in the accompanying claims.

The present invention provides as a first object a battery (1000) comprising at least one anode (3) and at least one cathode (1), alternately disposed one above the other, said battery (100) comprising lateral edges (101, 102) comprising at least one anode connection zone and at least one cathode connection zone, laterally opposite the anode connection zone, and longitudinal edges (103, 104), wherein the anode (3) comprises: a current-collecting substrate, at least one anode layer, and optionally a layer of an electrolyte material or of a separator impregnated with an electrolyte, wherein the cathode (1) comprises: a current-collecting substrate, at least one cathode layer, and optionally a layer of an electrolyte material or of a separator impregnated with an electrolyte, such that the battery comprises a unit stack successively formed by at least one anode layer, at least one layer of an electrolyte material or of a separator impregnated with an electrolyte, and at least one cathode layer, characterised in that:

each anode and each cathode comprises a respective primary body (111, 131), separated from a respective secondary body (112, 132) by a space (113, 133) free of any electrode material, electrolyte and current-collecting substrate, said free space connecting the opposing longitudinal edges (103, 104) of the battery, each anode and each cathode comprises, when viewed from overhead, at least one first through-hole (51, 53) made in the primary body and one second through-hole (52, 54) made in the secondary body, with the understanding that each first through-hole (51) made in the primary body of the cathode extends in the continuation of each second through-hole (54) made in the secondary body of the anode, such that these holes (51, 54) extending in the continuation of one another, form a first through-passage (61) which passes through the battery from end to end, and that each first through-hole (53) made in the primary body of the anode extends in the continuation of each second through-hole (52) made in the secondary body of the cathode, such that these holes (53, 52) extending in the continuation of one another, form a second through-passage (63) which passes through the battery from end to end, the battery further comprises at least one cathode conductive means (71, 71', 71") received in said first through-passage (61) and at least one anode conductive means (73, 73', 73") received in said second through-passage (63), the anode conductive means (73, 73', 73") being capable of collecting at least a part of the battery current flowing towards at least one anode connection zone and the cathode conductive means (71, 71', 71") being capable of collecting at least a part of the battery current flowing towards at least one cathode connection zone.

According to other features of the battery according to the invention, which may be taken in isolation or according to any technically compatible feature:

each through-passage extends at a distance from an opposing lateral edge (101, 102), the shortest distance ($D_{59}/D_{56}$) separating each through-passage (61) and said opposing lateral edge is comprised between 0.04 mm and 1.95 mm, each through-passage is made directly in said lateral edge (401, 402), the cathode or respectively the anode conductive means being flush with said lateral edge and having in particular the shape of a half-cylinder, the anode and cathode conductive means are chosen, indifferently from one another, from among: a bar made of an electrically conductive material, a tight fit metal rod, and a metal rod surrounded by an electrically conductive sheath material, the two opposite ends of either said bar or of said metal rod define fastening heads, the battery further comprises:

an electrical connection support, made at least in part from a conductive material, electrical insulation means, enabling two distant regions of this connection support to be insulated from one another, these distant regions forming respective electrical connection paths, said cathode conductive means being brought into electrical contact with a first electrical connection path, whereas said anode conductive means is brought into electrical contact with the second electrical connection path, the electrical connection support is of the single-layer type, in particular a metal grid or a silicon interlayer, the electrical connection support comprises a plurality of layers disposed one below the other, this support being in particular of the printed circuit board type, the transverse dimension, or width, of the free space (L113) is comprised between 0.01 mm and 0.5 mm, the transverse dimension, or width, of the secondary body (L112) is comprised between 0.05 mm and 2 mm, free faces of the secondary bodies respectively of the cathodes (112') and of the anodes (132'), which are opposite the free space, are flush with the free faces of the primary body respectively of the anodes (131') and of the cathodes (111'), it comprises an encapsulation system coating four of the six faces of said battery, and partially coating the other two faces, these other two faces being opposite and substantially perpendicular to the first and second through-passages (61, 63) of the battery comprising at least one anode connection zone and at least one cathode connection zone, the encapsulation system comprises:

at least one first cover layer, preferably chosen from among parylene, parylene F, polyimide, epoxy resins, silicone, polyamide, sol-gel silica, organic silica and/or a mixture thereof, deposited on the battery, at least one second cover layer consisting of an electrically insulating material, deposited by atomic layer deposition or PECVD, HDPCVD or ICP CVD on said at least one first cover layer, with the understanding that this sequence of at least one first cover layer and at least one second cover layer can be repeated z times, where z≥1, the encapsulation system further comprises: at least one first cover layer with a very low WVTR, preferably a WVTR of less than $10^{-5}$ g/m²·d, deposited at the outer periphery of the stack of anode and cathode foils, with the understanding that this first cover layer can be repeated z' times, where z'≥1, the at least first cover layer comprises:

a ceramic material, preferably chosen from among oxides, nitrides, oxynitrides, $Si_xN_y$, $SiO_2$, SiON, amorphous silicon or SiC, and/or a low melting point glass, preferably a glass with a melting point below 600° C., more preferably a low melting point glass chosen from among $SiO_2$—$B_2O_3$; $Bi_2O_3$—$B_2O_3$, ZnO—$Bi_2O_3$—$B_2O_3$, $TeO_2$—$V_2O_5$ and PbO—$SiO_2$, the battery further comprises a termination system covering at least the anode connection zone (75, 75') and at least the cathode connection zone (76, 76'), the termination system successively comprises: a first layer of conductive polymer, preferably a silver-filled resin, a second layer of nickel disposed on the first layer of the termination system, and a third layer of tin, disposed on the second layer of the termination system.

The invention also relates to a method of manufacturing the above battery, said manufacturing method comprising:

a) supplying a stack (I) of alternating foils, this stack comprising first foils or anode foils each of which is intended to form an anode layer of a plurality of batteries, and second foils or cathode foils each of which is intended to form a cathode layer of a plurality of batteries, each anode foil comprising at least one groove or zone (34) devoid of any anode and each cathode foil comprising at least one groove or zone (14) devoid of any cathode, each groove delimiting at least a part of said space free of any electrode material, electrolyte and current-collecting substrate, b) heat treating and/or mechanically compressing the previously supplied stack of alternating foils, c) for each anode and each cathode, producing at least one first through-hole (51, 53) in the primary body and producing at least one second through-hole (52, 54) in the secondary body, said first through-hole (51) made in the primary body of the cathode extending in the continuation of the second through-hole (54) made in the secondary body of the anode, such that these holes (51, 54) extending in the continuation of one another, form a first through-passage (61) which passes through the battery from end to end, and said first through-hole (53) made in the primary body of the anode extending in the continuation of the second through-hole (52) made in the secondary body of the cathode, such that these holes (53, 52) extending in the continuation of one another, form a second through-passage (63) which passes through the battery from end to end, with the understanding that step c) can be carried out before step a) on the anode and cathode foils or after step b), d) inserting a cathode conductive means (71, 71', 71") into the first through-passage (61) and an anode conductive means (73, 73', 73") into the second through-passage (63), each of these conductive means being capable of collecting at least a part of the battery current, and e) making cuts ($D_n$, $D'_n$) to insulate a given battery.

According to other features of the process according to the invention, which may be taken in isolation or according to any technically compatible feature:

the through-passages are made at a distance from the lateral edge, at least one perforation is made along the path of each cut, each perforation delimiting at least a part of each through-passage, said anode groove and cathode grooves, respectively, comprise two longitudinal parts (16, 36) at least partly superimposed, intended to delimit the longitudinal edges (103, 104) of the battery, as well as a lateral part (18, 38) connecting said two longitudinal parts, the lateral part of the anode groove (38) and the lateral part of the cathode groove (18) being offset from one another, the first cut extending between the lateral part of the anode groove and the end facing the longitudinal parts, whereas the second cut extends between the lateral part of the cathode groove and the end facing the longitudinal parts, each groove has an overall H shape, with the longitudinal parts forming the vertical main recesses of the H, whereas the lateral part forms the channel of the H, said anode and cathode grooves, respectively, are elongated, in particular having an I-shape, said anode grooves being superimposed on top of one another, said cathode grooves being superimposed on top of one another, said anode grooves being offset relative to said cathode grooves so as to define a plurality of intermediate spaces, said cuts being made in said intermediate spaces, the method further comprises, after step b) or after step e) of producing the cut stack, a step f) of impregnating the cut stack with a phase carrying lithium ions such as liquid electrolytes or an ionic liquid containing lithium salts, the method further comprises, after step e) or after step f), encapsulating the cut stack, by depositing:

at least one first cover layer, preferably chosen from among parylene, parylene F, polyimide, epoxy resins, silicone, polyamide, sol-gel silica, organic silica and/or a mixture thereof, on the battery, and then at least one second cover layer consisting of an electrically insulating material, deposited by atomic layer deposition or PECVD, HDPCVD or ICP CVD on said at least one first cover layer, with the understanding that the sequence of at least one first cover layer and at least one second cover layer can be repeated z times, where z≥1, the two cuts ($D_n$, $D'_n$) are made through at least a majority of the anodes and cathodes, in particular through all of the anodes and cathodes, The invention also has as object an electric energy-consuming device comprising a body (2002) and the above battery, said battery being capable of supplying electric energy to said electric energy-consuming device, and in which the electric connection support of said battery is fastened to said body.

Finally, the invention has the object of a method of manufacturing a battery, said battery comprising at least one anode (3) and at least one cathode (1), disposed alternately one above the other, said battery (100) comprising longitudinal edges (103, 104) and lateral edges (101, 102), wherein the anode (3) comprises: a current-collecting substrate, at least one anode layer, and optionally a layer of an electrolyte material or of a separator impregnated with an electrolyte, and the cathode (1) comprises: a current-collecting substrate, at least one cathode layer, and optionally a layer of an electrolyte material or of a separator impregnated with an electrolyte, such that the battery comprises a unit stack successively formed by at least one anode layer, at least one layer of an electrolyte material or of a separator impregnated with an electrolyte, and at least one cathode layer, each anode (3) comprising an anode connection zone, situated in the vicinity of a first lateral edge of the battery, whereas each cathode (1) comprises a cathode connection zone, situated on a second lateral edge of the battery, opposite said first edge, in which battery each anode and each cathode comprises a respective primary body (111, 131), separated from a respective secondary body (112, 132) by a space (113, 133) free of any electrode material, electrolyte and current-collecting substrate, said free space connecting the opposing longitudinal edges (103, 104) of the battery, the manufacturing method comprising:

a) supplying a stack (I) of alternating foils, this stack comprising first foils or anode foils each of which is intended to form an anode layer of a plurality of batteries, and second foils or cathode foils each of which is intended to form a cathode layer of a plurality of batteries, each anode foil comprising at least one groove or zone (34) devoid of any anode and each cathode foil comprising at least one groove or zone (14) devoid of any cathode, each groove delimiting at least a part of said space free of any electrode material, electrolyte and current-collecting substrate, heat treating and/or mechanically compressing the previously supplied stack of alternating foils, b) heat treating and/or mechanically compressing the previously supplied stack of alternating foils, and c) making two cuts ($D_n$, $D'_n$) extending at least partially inside said grooves, the first cut extending between the lateral part of the anode groove and the end facing the longitudinal parts, whereas the second cut extends between the lateral part of the cathode groove and the end facing the longitudinal parts, the method being characterised in that at least one perforation is made along the path of each cut, so that this cut is easy to make using a cutting tool.

DRAWINGS

The accompanying figures, given as non-limiting examples, show different aspects and embodiments of the invention. [FIG. 12] shows a battery according to the prior art.

FIG. 15 is a perspective view showing a battery according to the invention, which can be obtained in particular according to the second alternative embodiment of the invention.

FIGS. 16A, 16B, and 16C are sectional views, along the line XVI-XVI shown in FIG. 15, of a battery according to the invention, which can be obtained in particular according to the method shown in the preceding figures, and wherein first and second passages made in this battery are filled with conductive means in order to make the electrical connection between the cells of the battery.

Figure 17:
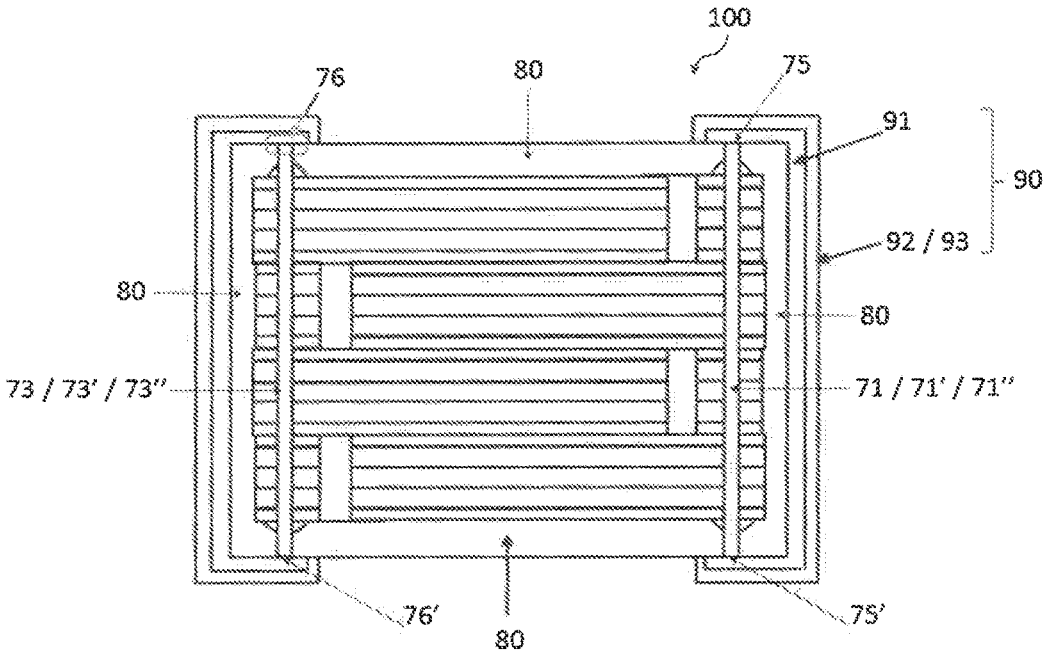

FIG. 17 is a sectional view of a battery according to the invention, which can be obtained in particular by the method shown in the preceding figures, this battery comprising the conductive means for making the electrical connection between the cells of the battery and an encapsulation system.

Figure 5:
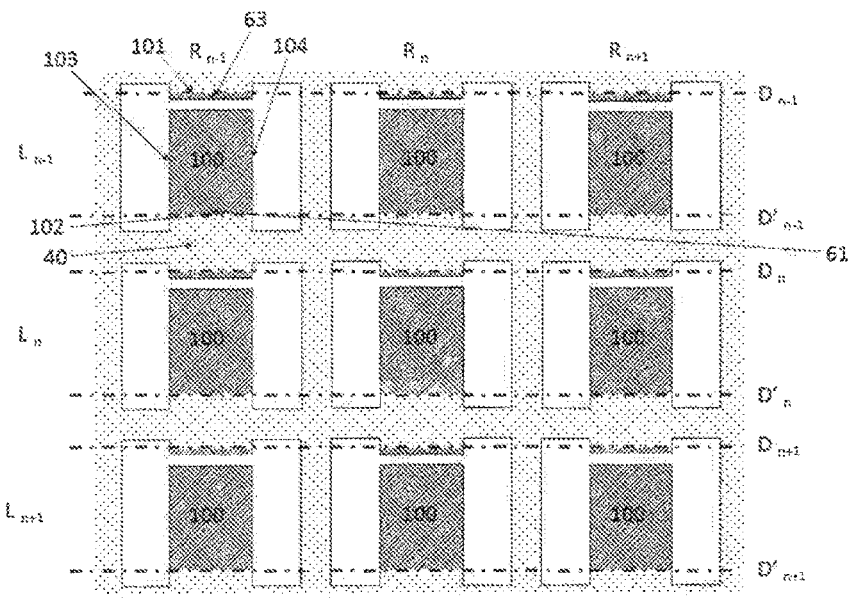
FIG. 5 is an overhead view showing a cutting step carried out on different grooves made in the stack in the preceding figures.
Figure 18:
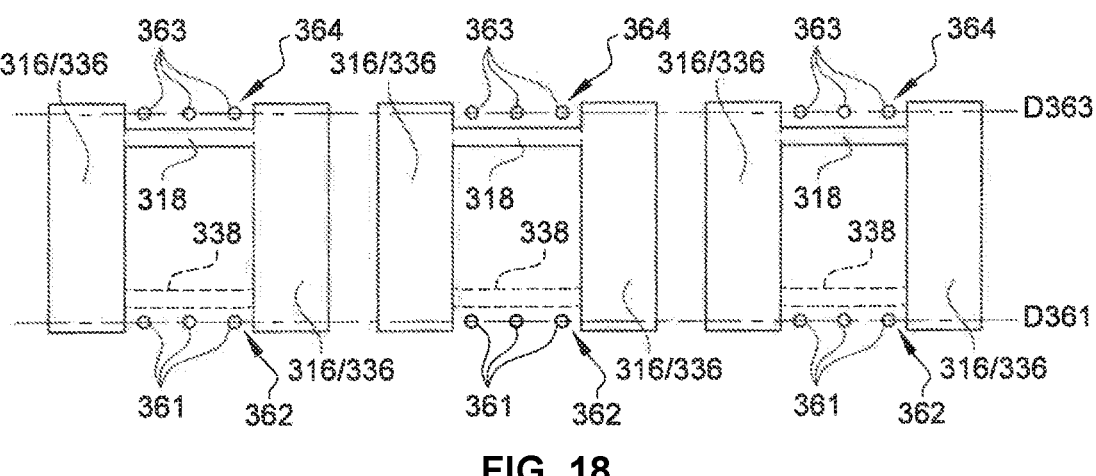

FIG. 18 is a view similar to that in FIG. 5, showing a method for manufacturing a battery according to an alternative embodiment of the invention.

Figure 19:
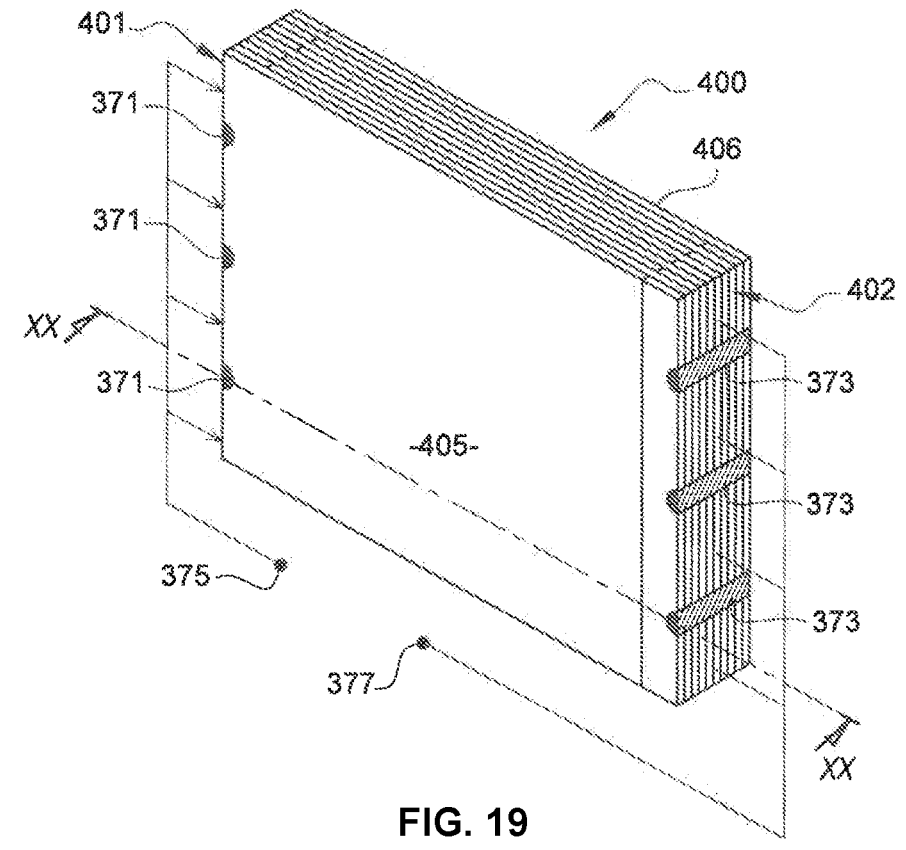

FIG. 19 is a perspective view showing the battery formed using the method shown in FIG. 18.

Figure 20:
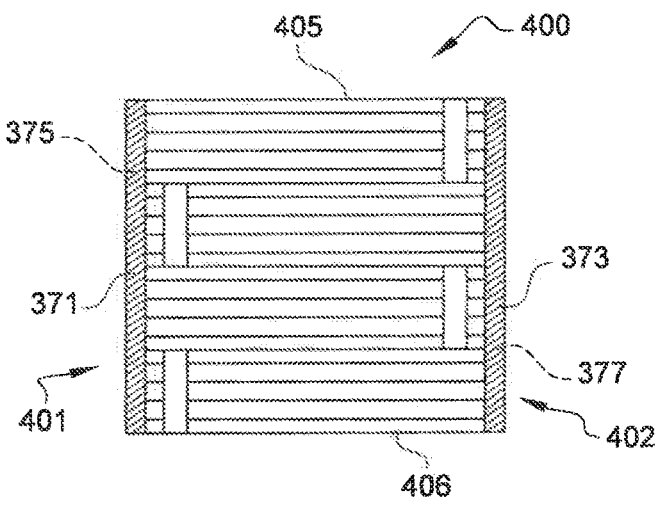

FIG. 20 is a sectional view similar to that in FIG. 16, showing the battery in FIG. 19.

Figure 21:
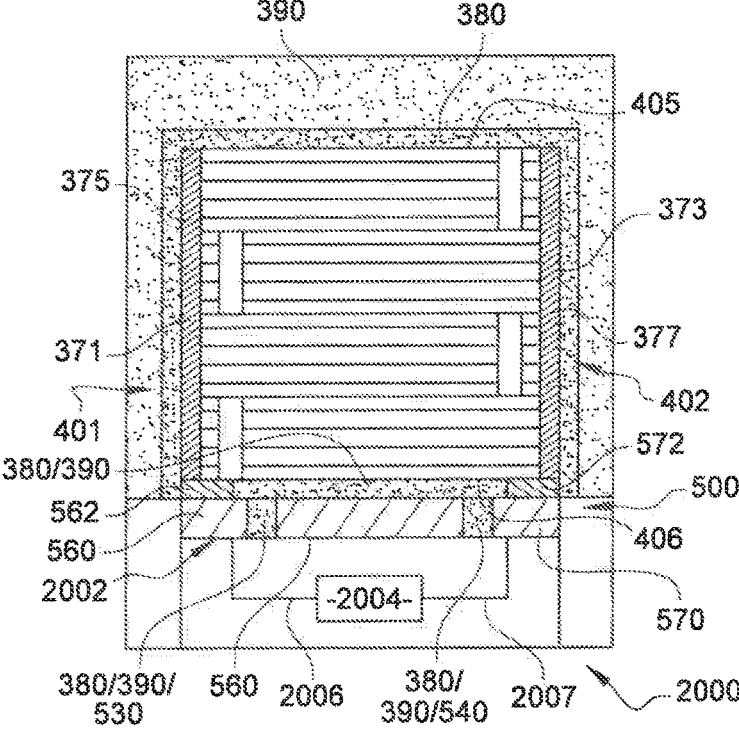

FIG. 21 is a sectional view similar to that in FIG. 20, showing the battery in FIG. 20, which further includes an encapsulation and a conductive support, while being integrated into an energy-consuming device.

Figure 22:
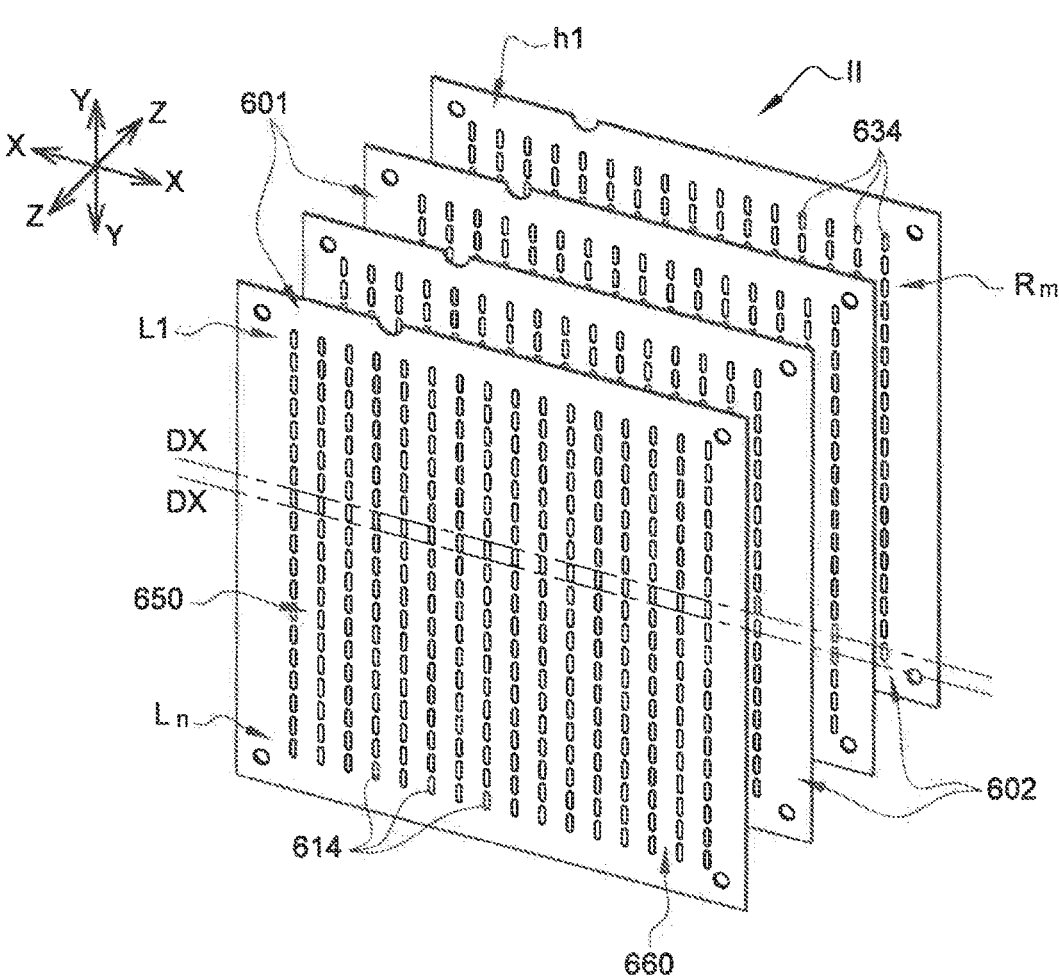

FIG. 22 is a perspective view, similar to that in the first figure, showing another embodiment of the anode foils and cathode foils.

Figure 23:
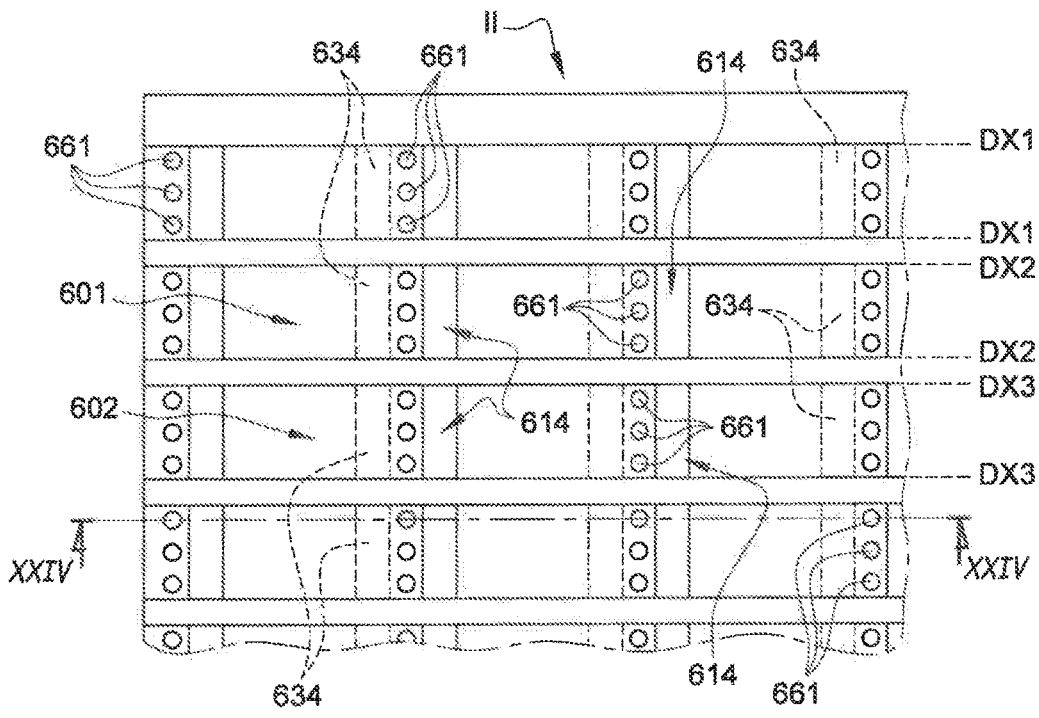

FIG. 23 is a view similar to that in FIG. 18, showing a manufacturing method using the foils in FIG. 22.

Figure 24:
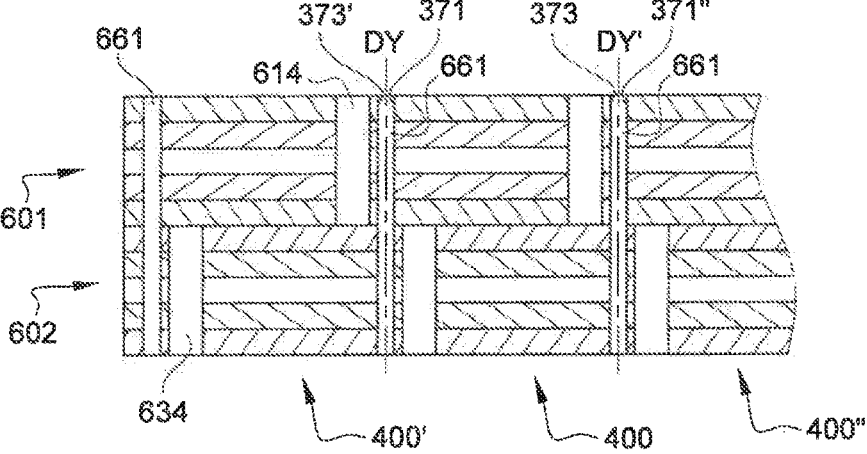

FIG. 24 is a sectional view along the line XXIV in FIG. 23, showing a strip formed from a cut shown in FIG. 23.

Figure 25:
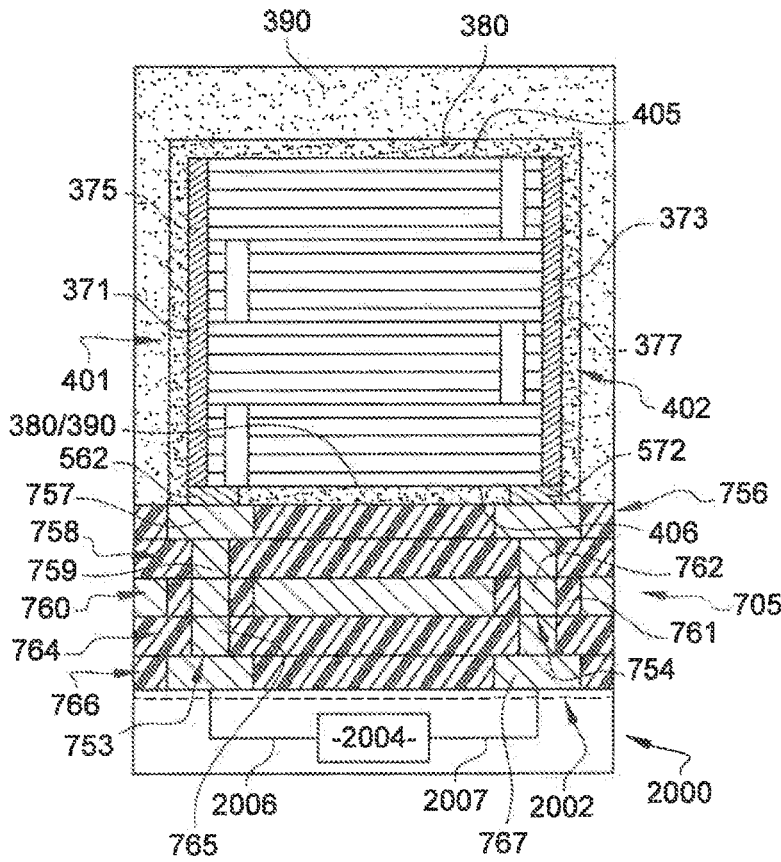

FIG. 25 is a sectional view similar to that in FIG. 21, showing the battery which includes a conductive support according to an alternative embodiment of the invention.

DESCRIPTION

Figure 1:
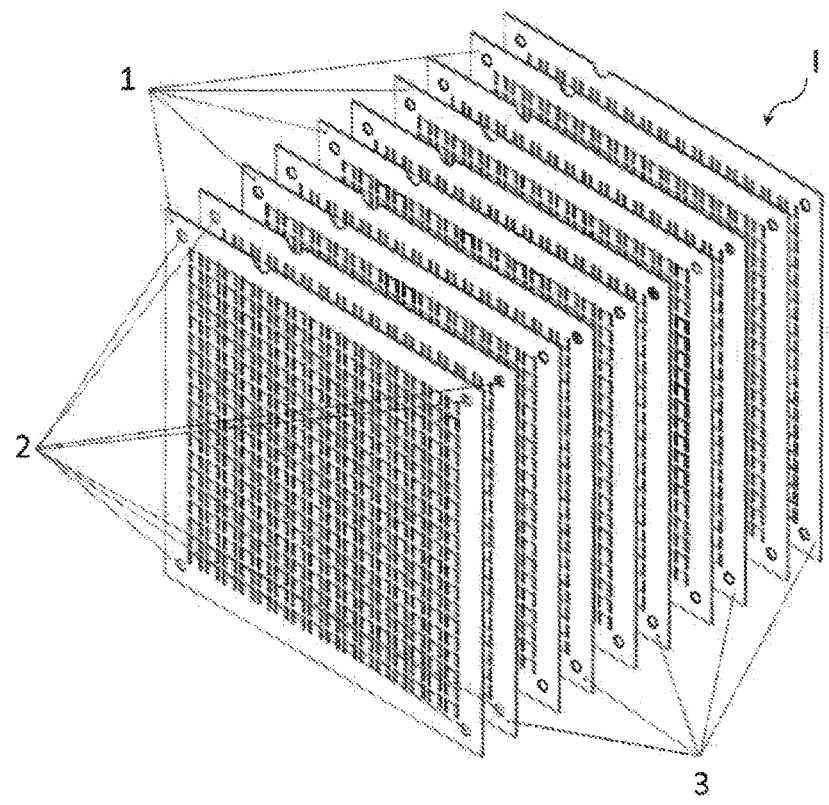
FIG. 1 is a perspective view of the anode and cathode foils intended to form a stack according to the method for manufacturing batteries according to the invention.

The method according to the invention firstly comprises a step wherein a stack I of alternating foils is produced, these foils being referred to hereinbelow as "anode foils" and "cathode foils" depending on the case at hand. As will be seen in more detail hereafter, each anode foil is intended to form the anode of a plurality of batteries, and each cathode foil is intended to form the cathode of a plurality of batteries. The example shown in FIG. 1 illustrates five cathode foils 1 and five anode foils 3. In practice, this stack is formed by a higher number of foils, typically between ten and one thousand. In one advantageous embodiment, all of these foils have perforations 2 at the four ends thereof so that when these perforations 2 are superimposed, all of the cathodes and all of the anodes of these foils are specifically arranged, as will be explained in more detail hereinbelow (see FIGS. 1 and 2). These perforations 2 at the four ends of the foils are positioning marks for aligning the foils during the stacking thereof.

These perforations 2 at the four ends of the foils can be made by any suitable means, in particular in anode and cathode foils after manufacture or in anode and/or cathode foils coated with an electrolyte layer or coated with a separator such that this electrolyte layer or this separator is sandwiched between two foils of opposite polarity, i.e. between the anode foil and the cathode foil.

The physical-chemical structure of each anode or cathode foil, which can be of a known type, does not fall within the scope of the invention and will be described only briefly. Each anode foil 3 comprises an anode current-collecting substrate coated with an active layer of an anode material, hereinafter referred to as an anode layer. Each cathode foil 1 comprises a cathode current-collecting substrate coated with an active layer of a cathode material, hereinafter referred to as a cathode layer. Each of these active layers can be solid, and more particularly have a dense or porous nature. Moreover, in order to prevent any electrical contact between two adjacent foils, i.e. between two active layers of opposite polarity, an electrolyte layer or a separator impregnated with a liquid electrolyte (not shown in FIG. 1) is disposed on at least one of these two foils, i.e. on the active layer of at least one of these current-collecting substrates previously coated with the active layer, in contact with the active layer of the opposite foil. The electrolyte layer or the separator impregnated with a liquid electrolyte, not shown in the figures describing the present invention, is sandwiched between two foils of opposite polarity, i.e. between the anode foil and the cathode foil. More specifically, the electrolyte layer or the separator can be disposed on the anode layer and/or on the cathode layer; the electrolyte layer or the separator forms an integral part of the anode foil 3 and/or of the cathode foil 1 comprising same.

A unit cell of a battery successively comprises at least one anode current-collecting substrate, at least one anode layer, at least one layer of an electrolyte material or of a separator impregnated with an electrolyte, at least one cathode layer, and at least one cathode current-collecting substrate. The current-collecting substrates can be metal strips.

Advantageously, the two faces of the anode or respectively cathode current-collecting substrate can be coated with an anode layer or respectively with a cathode layer, and optionally with an electrolyte or separator layer, disposed on the anode layer or respectively on the cathode layer. In such a case, the anode or respectively the cathode current-collecting substrate will act as a current collector for two adjacent unit cells. The use of these substrates in the batteries increases the production output for rechargeable batteries with a high energy density and a high-power density.

The mechanical structure of one of the cathode foils 1 will now be described, with the understanding that the other cathode foils have an identical structure. Furthermore, as will be seen hereinbelow, the anode foils 3 have a structure that is very similar to that of the cathode foils 1.

Figure 2:
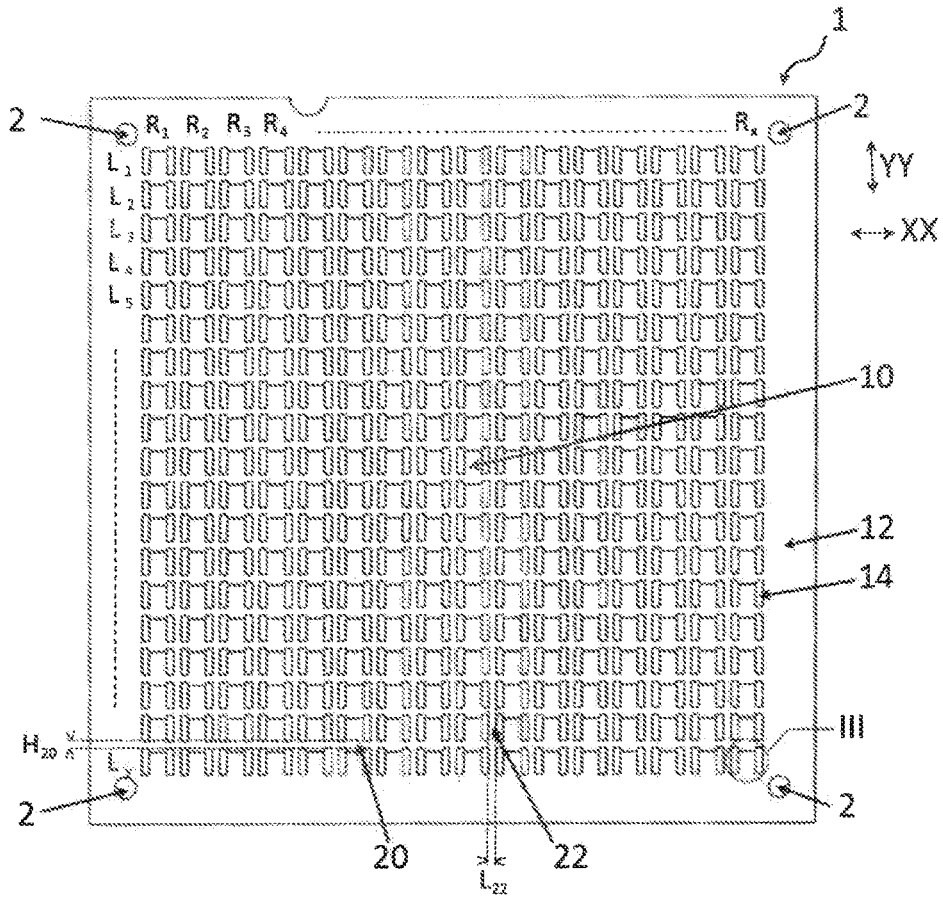
FIG. 2 is a front view showing one of the foils in FIG. 1.

As shown in FIG. 2, the cathode foil 1 has a quadrilateral shape, substantially a square shape. It delimits a so-called perforated central zone 10, wherein H-shaped grooves are made, which will be described hereinbelow. With reference to the positioning of these H-shaped grooves, a so-called vertical direction YY of the foil is defined, which corresponds to the vertical direction of these H's, as well as a so-called horizontal direction XX of the foil, perpendicular to the direction YY. The central zone 10 is bordered by a peripheral frame 12 which is solid, i.e. free of grooves. The function of this frame is in particular to ensure the easy handling of each foil.

The H-shaped grooves are distributed into lines L1 to Ly, disposed one below the other, and into rows R1 to Rx disposed next to one another. By way of non-limiting examples, within the scope of the manufacture of micro-batteries of the surface-mount device type (hereinafter referred to as SMD), the anode and cathode foils used can be 100 mm×100 mm wafers. Typically, the number of lines of these foils is comprised between 10 and 500, whereas the number of rows is comprised between 10 and 500. As a function of the desired battery capacity, the dimensions thereof can vary and the number of lines and rows per anode and cathode foil can be adjusted accordingly. The dimensions of the anode and cathode foils used can be modulated according to requirements. As shown in FIG. 2, two adjacent lines are separated by bridges of material 20, the height whereof, denoted H20, is comprised between 0.05 mm and 5 mm. Two adjacent rows are separated by strips of material 22, the width whereof, denoted L22, is comprised between 0.05 mm and 5 mm. These bridges and strips of material of the anode and cathode foils give them sufficient mechanical stiffness for them to be easily handled.

The grooves 14 are penetrating, i.e. they open out respectively on the top and bottom faces of the foil. The grooves 14 can be produced in a manner known per se, directly on the substrate, prior to any deposition of anode or cathode materials by chemical etching, electroforming, laser cutting, microperforation or stamping. These grooves can also be produced on substrates coated with anode or cathode materials, or on anode or cathode foils coated with an electrolyte layer or with a separator in a manner known per se, for example by laser cutting, femtosecond laser cutting, microperforation or stamping. The grooves 14 made in all of the cathodes are superimposed as shown in particular in FIG. 3.

One of the H-shaped grooves 14 will now be described, with the understanding that all of the cuts made in the cathode foil are identical. The groove 14 is formed by two vertical and parallel main recesses 16, which are connected in the top part thereof by a horizontal channel 18, preferably perpendicular to the two vertical main recesses 16. The following denotations are given:

H14 is height of the entire groove, which is typically comprised between 0.25 mm and 10 mm;

L14 is the width thereof, which is typically comprised between 0.25 mm and 10 mm;

L16 is the width of each main recess, which is typically comprised between 0.02 mm and 5 mm;

H18 is the height of each channel, which is typically comprised between 0.01 mm and 0.5 mm;

D18 is the difference in height between the top of the main recesses and the top of the channel, which is typically comprised between 0.05 mm and 2 mm.

Figure 10:
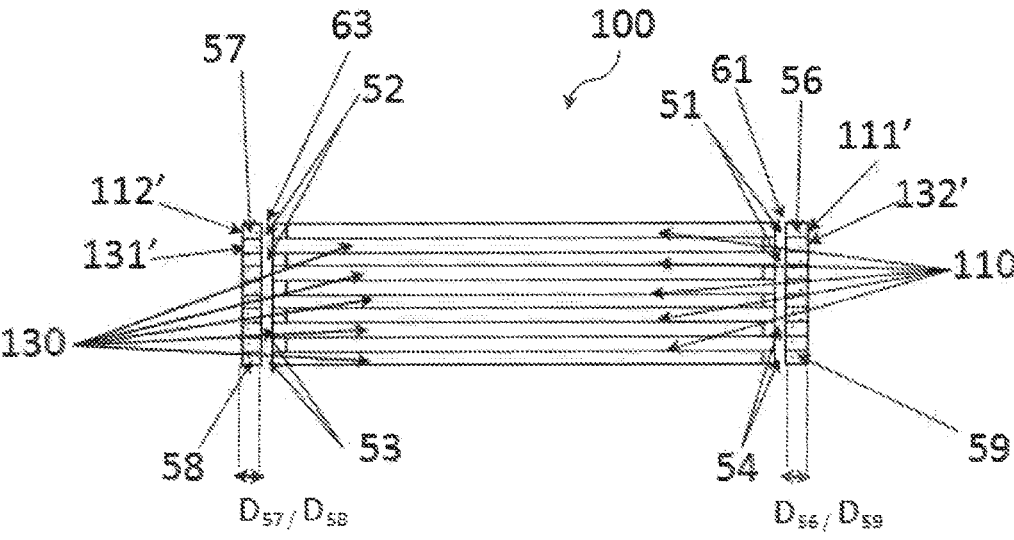
FIG. 10 is a sectional view, along the X-X line shown in FIG. 6, of a battery according to the invention, which can be obtained in particular according to the method shown in the preceding figures.

Furthermore, as shown in particular in FIG. 10, at least a first through-hole 51 is made in the primary body and a second through-hole 52 is made in the secondary body.

The through-holes 51, 52, 53, 54 are also referred to as penetrating, i.e. they open out respectively onto the top and bottom faces of the foil. These through-holes can be made in a manner known per se directly on the anode and/or cathode foils before stacking or after stacking alternating foils comprising first foils or anode foils each of which is intended to form an anode layer of a plurality of batteries, and second foils or cathode foils each of which is intended to form a cathode layer of a plurality of batteries. The through-holes can be made by chemical etching, electroforming, laser cutting, microperforation or stamping.

Figure 3:
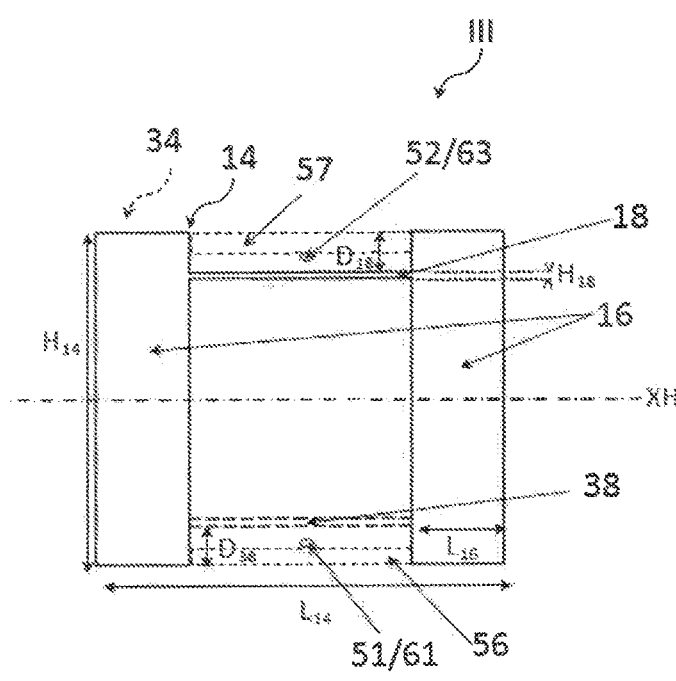
FIG. 3 is a front view, at a larger scale, showing H-shaped grooves made in adjacent foils as well as first and second passages made in adjacent foils.

The first 51 and second 52 through-holes, made in all of the cathodes, are superimposed as shown in particular in FIG. 3. The through-holes 53 and 54 are shown in FIG. 10.

Each anode is further provided with different lines and rows of grooves 34, provided in the same number as there are grooves 14. As shown in particular in FIG. 4, the structure of each groove 34 is substantially similar to that of each groove 14, i.e. this groove 34 comprises two vertical main recesses 36, connected by a channel 38. The dimensions of the vertical main recesses 36 are identical to those of the vertical main recesses 16 and, similarly, the dimensions of the channels 38 are similar to those of the channels 18.

When viewed from overhead, the vertical main recesses 36 are superimposed with the vertical main recesses 16. The only difference between the grooves 14 and 34 is that the channels 38 are provided in the bottom part. As shown in particular in FIG. 3, the channels 18 and 38 are mutually symmetrical when viewed from overhead, relative to the median line of the H's, which is denoted XH.

Furthermore, as shown in particular in FIG. 3, at least a first through-hole 53 is made in the primary body and a second through-hole 54 is made in the secondary body.

Advantageously, the first through-hole 51 made in the primary body of the cathode extends in the continuation of the second through-hole 54 made in the secondary body of the anode, such that these holes 51/54 extend in the continuation of one another, and form a first through-passage 61 which passes through the battery from end to end. Furthermore, the first through-hole 53 made in the primary body of the anode extends in the continuation of the second through-hole 52 made in the secondary body of the cathode, such that these holes 53, 52 extend in the continuation of one another, and form a second through-passage 63 which passes through the battery from end to end.

Advantageously the second through-holes 52, 54 are made at a certain distance from the channels 18 and 38 of the grooves in order to prevent any risk of a short-circuit while maintaining the mechanical strength of the stack. This distance is advantageously chosen as a function of the nature of the anode and cathode foils, in particular the nature of the current-collecting substrate used, the thickness thereof and the stiffness thereof. The presence of these through-holes in the stack must not weaken the mechanical strength of the stack. The dimensions of the through-holes can be modulated depending on the requirements.

Advantageously, the first and second through-holes 53, 52, 51, 54 are made at a certain distance from the lateral edges 101 and 102 of the battery, delimiting a band of material 56, 57, 58, 59 as described in detail hereinbelow. Advantageously, the second through-holes respectively 52, 54 are made in the respective secondary bodies 112, 132 at a certain distance from the respective free spaces 113, 133 in the battery, delimiting a second band of material not shown in the figures. It is assumed that the stack, described hereinabove, is subjected to steps ensuring the overall mechanical stability thereof. These steps, which are known per se, in particular include hot pressing the different layers. As will be seen hereinbelow, this stacking allows for the formation of individual batteries, the number whereof is equal to the product of the number of lines Y and the number of rows X.

For this purpose, with reference to FIG. 5, three lines Ln−1 to Ln+1 and three rows Rn−1 to Rn+1 have been shown. According to the invention, two cuts $D_n$ and D'n are made per line of grooves. Each cut, which is made in a penetrating manner, i.e. it extends through the entire height of the stack, is made in a manner known per se. Non-limiting examples include cutting by sawing, in particular cutting into cubes, guillotine cutting or laser cutting.

Figure 6:
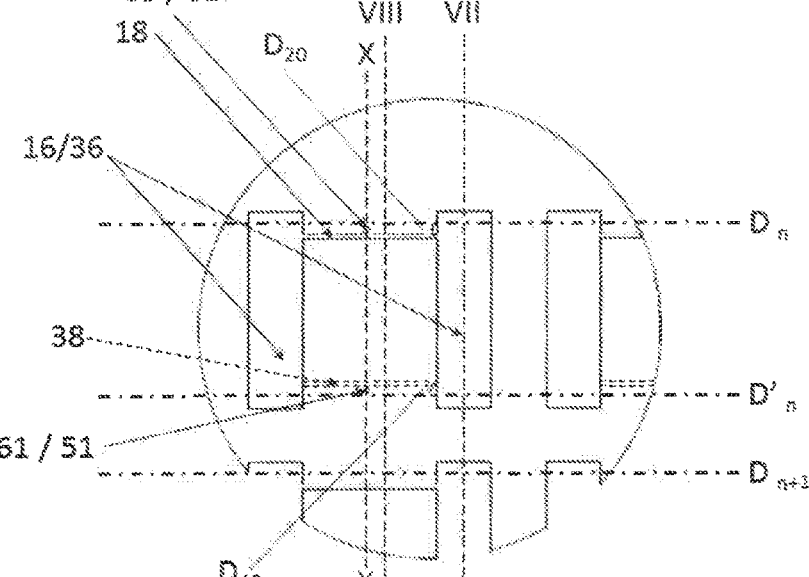
FIG. 6 is an overhead view showing the cuts made along a H-shaped groove at a larger scale.

As shown in particular in FIG. 6, which is a larger scale view of one of the grooves in FIG. 5, each cut is made between a respective channel and the end facing the H. It is assumed that the thickness of said cut is disregarded. Under these conditions, with reference to this FIG. 6, in the form of non-limiting examples, the following should be noted:

the distance D20 between the cut Dn and the opposite face of the horizontal channel 18 is comprised between 0.05 mm and 2 mm, with the understanding that this distance D20 is less than or equal to D18;

the distance D40 between cut D'n and the opposite face of the horizontal channel 38 is comprised between 0.05 mm and 2 mm, with the understanding that this distance D40 is less than or equal to D38.

Still with reference to FIG. 5, each final battery is delimited, at the top and bottom, by the two cuts and, on the right and left, by the inner faces of the vertical main recesses of the H. In this FIG. 5, the batteries 100, once cut along the cutting lines Dn and D'n, have been hatched, and the zones 40 of the foils in the stack that do not form the batteries have been shown as dotted, whereas the volume of the grooves has been left blank. Moreover, FIG. 5 shows the first and second passages 61/63 that pass through the battery from end to end, which passages will be subsequently filled with conductive means projecting from both the top and bottom surfaces of the battery. These first and second passages 61, 63 are preferably substantially perpendicular to the cathode foils and to the anode foils making up the stack.

Figure 7:
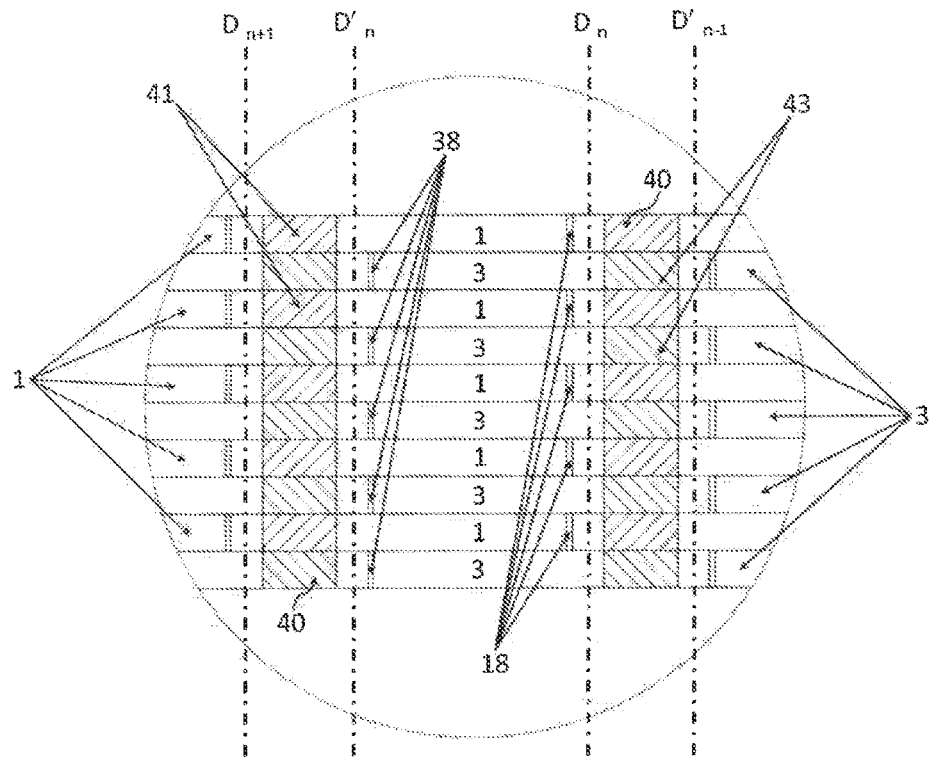
FIG. 7 is a sectional view along the VII-VII line shown in FIG. 6.
Figure 8:
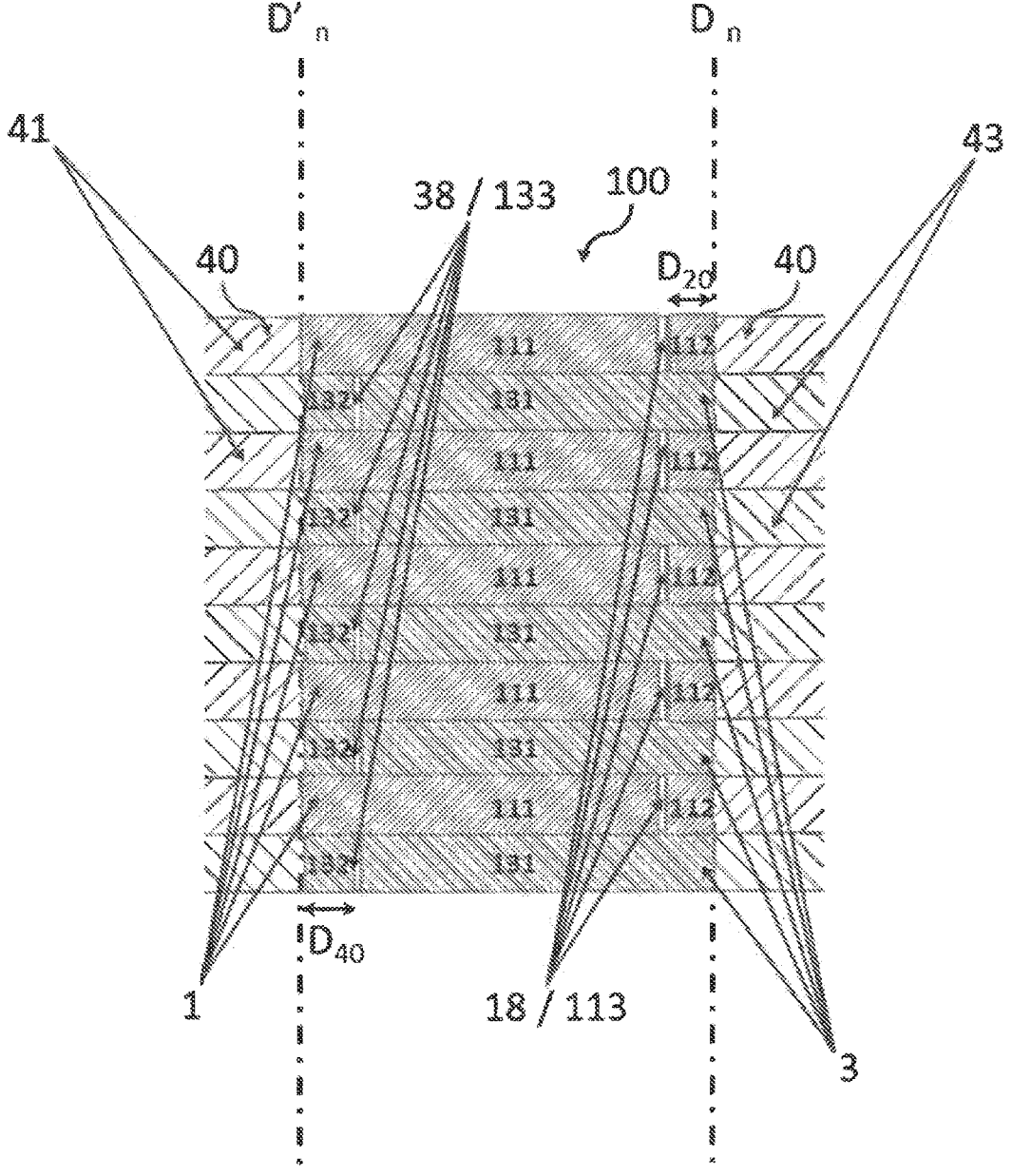
FIG. 8 is a sectional view along the VIII-VIII line shown in FIG. 6.

FIGS. 7 and 8 are sectional views taken along parallel cutting lines. The cutting plane VII-VII extends through the vertical main recesses of the H, whereas the cutting plane VIII-VIII passes through the material. FIG. 7 shows the zones 40, also shown in FIG. 5, which correspond to material offcuts, particularly offcuts of anode materials 43 and of cathode materials 41. FIG. 8 shows that the cuts are made through both the anodes and cathodes, i.e. at a distance D20 from the channels of the H-shaped grooves so as to have, for each cathode 1, respectively each anode 3, of the battery 100, a primary body 111, respectively 131, separated from a secondary body 112, respectively 132, by a space free of any electrode material, electrolyte and/or current-collecting substrate 113, respectively 133. This is a particularly advantageous feature of the invention in that it improves the quality of the cut compared to the prior art and prevents short-circuits at the lateral edges of the battery.

The International Patent Publication No. WO 2016/001584 describes stacks of a plurality of unit cells, made up of anode and cathode foils stacked in an alternating manner and laterally offset (see FIG. 12), encapsulated in an encapsulation system to protect the battery cell from the atmosphere. The cutting of these encapsulated stacks to obtain unit batteries, with bare anode and cathode connections, is carried out along a cutting plane passing through an alternating succession of electrodes and encapsulation systems. Due to the difference in density between the electrode and the encapsulation system of the battery of the prior art, cutting along this cutting plane creates a risk of the encapsulation system being torn away in the vicinity of the cutting plane, and thus the creation of short-circuits. In the prior art, during encapsulation, the encapsulation layer fills the gaps of the stack of the foils bearing the U-shaped cuts. This encapsulation layer inserted at these gaps is thick and does not adhere very well to the stack, which results in this risk of the encapsulation system being torn away during subsequent cutting.

According to the present invention, this risk is eliminated with the use of foils bearing H-shaped cuts, because the hot-pressed H-shaped mechanical structure is extremely stiff in the vicinity of the cut as a result of the alternating superimposition of cathode and anode foils. The use of such a stiff structure, together with the use of foils bearing H-shaped cuts, allows the number of defects during cutting to be reduced, the cutting speed to be increased and thus the production output of the batteries to be improved.

According to the invention, the D'n and Dn cuts are made through the anodes and cathodes of similar density, inducing a higher quality, clean cut. Furthermore, the presence of a space free of any electrode material, electrolyte and/or current-collecting substrate prevents any risk of a short-circuit.

Figure 9:
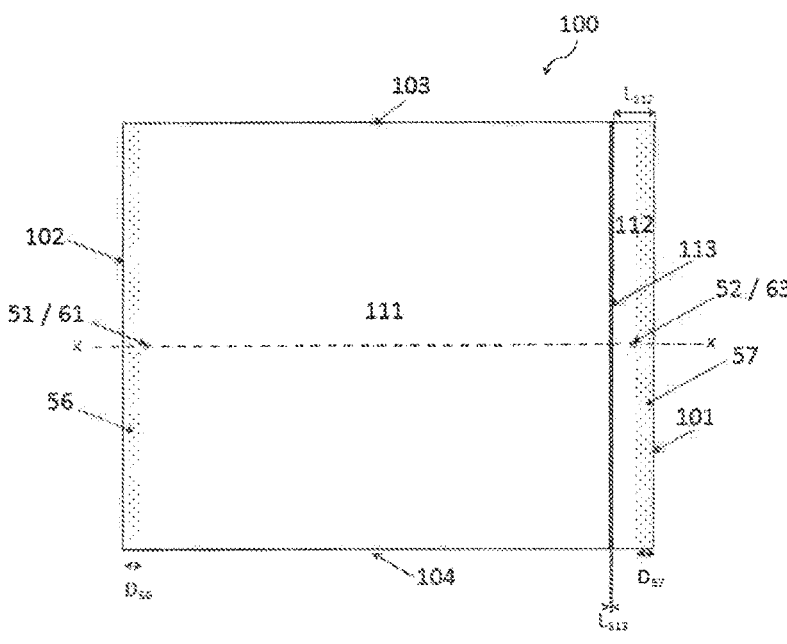
FIG. 9 is an overhead view showing a battery according to the invention, which can be obtained in particular according to the method shown in the preceding figures.
Figure 11:
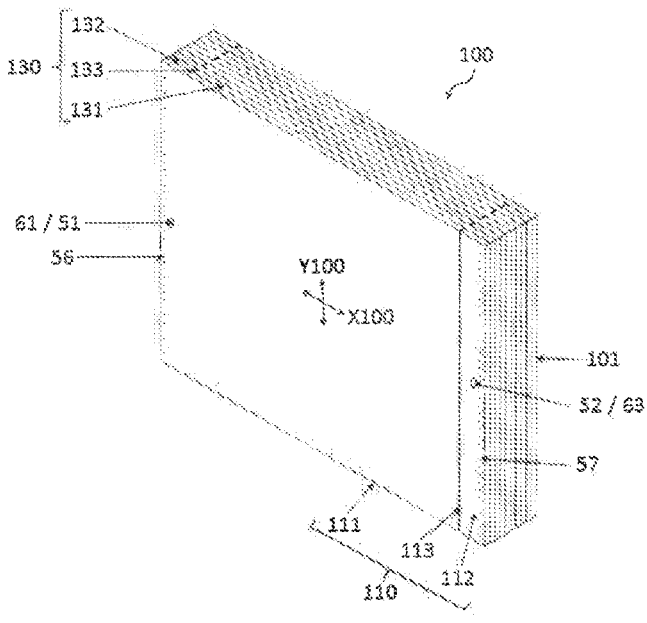
FIG. 11 is a perspective view showing a battery according to the invention, which can be obtained in particular according to the method shown in the preceding figures.

Reference is now made to FIGS. 9 to 11, which show one 100 of the batteries according to the invention. The longitudinal and lateral median lines of this battery are respectively given the references X100 and Y100. The lateral edges of this battery are given the reference numerals 101 and 102, and the longitudinal edges of this battery are given the reference numerals 103 and 104. Moreover, each cathode is given the reference numeral 110 and each anode is given the reference numeral 130. The number of these cathodes, which is identical to the number of these anodes, corresponds to the number of cathode foils and of anode foils in the stack described hereinabove.

As shown in FIG. 9, i.e. when viewed from overhead, the free spaces in the cathodes are superimposed. Moreover, according to this same overhead view, the free spaces in the anodes are superimposed. Finally, according to this same overhead view, the free spaces in the cathodes and of the anodes are not aligned, i.e. they are not superimposed on one another. This is in particular shown, by way of example, in FIG. 10.

The free space 113 connects the opposing longitudinal edges of the battery, which are shown as top and bottom edges in FIG. 9. This free space extends between the opposing longitudinal edges of the battery separating, for each anode and each cathode, a primary body from a secondary body.

Each cathode 110 comprises a primary body 111, a secondary body 112 situated on a first lateral edge 101, and a space free of any electrode material, electrolyte and/or current-collecting substrate 113. The latter, whose width corresponds to that of the channel 18 of the groove 14 described hereinabove, extends between the longitudinal edges 103 and 104. Similarly, each anode 130 comprises a primary body 131, as well as a secondary body 132 situated on the lateral edge 102, opposite the edge 101. The primary body 131 and the secondary body 132 are separated by a space 133 free of any electrode material, electrolyte and/or current-collecting substrate, connecting the edges 103 and 104, i.e. extending between the longitudinal edges 103 and 104. The 2 free spaces 113 and 133 are mutually symmetrical, relative to the median line Y100.

The width L113 of each free space 113 corresponds to the width of the channel 18 belonging to the groove described in the preceding figures. Moreover, the width L112 of each secondary body 112 corresponds to the distance D20, as described with reference to FIG. 6 or FIG. 8.

Figure 13:
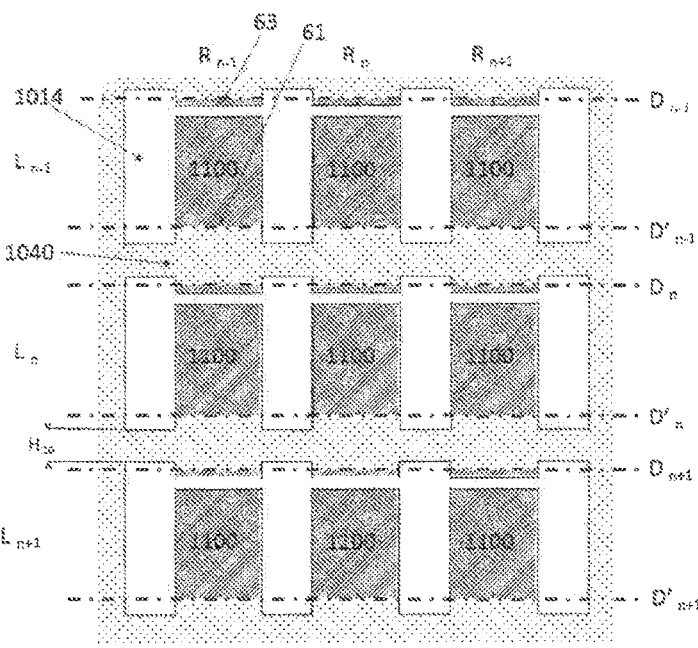
FIG. 13 is an overhead view showing a cutting step carried out on different H-shaped grooves made in an anode foil or a cathode foil according to a second alternative embodiment of the invention and showing the first and second passages made in this anode or cathode foil according to the second alternative embodiment of the invention.

FIG. 13 shows an additional alternative embodiment of the invention. In this FIG. 13, any mechanical elements similar to those in FIGS. 1 to 11 showing the first embodiment, are given the same reference numerals incremented by 1000.

This second alternative embodiment differs from the first alternative embodiment essentially in that the H-shaped grooves 1014 are distributed into lines L1 to Ly, disposed one below the other, and into rows R1 to Rx disposed next to one another. In this manner, at least one of the vertical main recesses 1016 of the groove positioned in row Rn is aligned with at least one of the vertical main recesses 1016 of the adjacent groove positioned in row Rn−1 and/or Rn+1. In such a case, the two adjacent rows are not separated by strips of material. As shown in FIG. 13, two adjacent lines are separated by bridges of material 1020, the height whereof, denoted H1020, is comprised between 0.05 mm and 5 mm. These bridges of material give the anode and cathode foils sufficient mechanical stiffness for them to be easily handled.

In this second alternative embodiment of the invention, the H-shaped grooves 1014 can preferably be the same as in the first alternative embodiment. The groove 1014 is preferably formed by two vertical and parallel main recesses

1016, which are connected in the top part thereof by a horizontal channel 1018, preferably perpendicular to the two vertical main recesses 1016.

Each cathode is provided with different lines and rows of grooves 1014. Each anode is further provided with different lines and rows of grooves 1034, provided in the same number as there are grooves 1014.

The structure of each groove 1034 is substantially similar to that of each groove 1014, i.e. this groove 1034 comprises two vertical main recesses 1036, connected by a channel 1038. The dimensions of the vertical main recesses 1036 are identical to those of the vertical main recesses 1016 and, similarly, the dimensions of the channels 1038 are similar to those of the channels 1018.

When viewed from overhead, the vertical main recesses 1036 are superimposed with the vertical main recesses 1016. The only difference between the grooves 1014 and 1034 is that the channels 1038 are provided in the bottom part. As shown in particular in FIG. 14, the channels 1018 and 1038 are mutually symmetrical when viewed from overhead, relative to the median line of the H's, which is denoted XH'.

It is assumed that the stack of the anode and cathode foils, described hereinabove, is subjected to steps ensuring the overall mechanical stability thereof. These steps, which are known per se, in particular include hot pressing the different layers. As will be seen hereinbelow, this stacking allows for the formation of individual batteries, the number whereof is equal to the product of the number of lines Y and the number of rows X.

Figure 14:
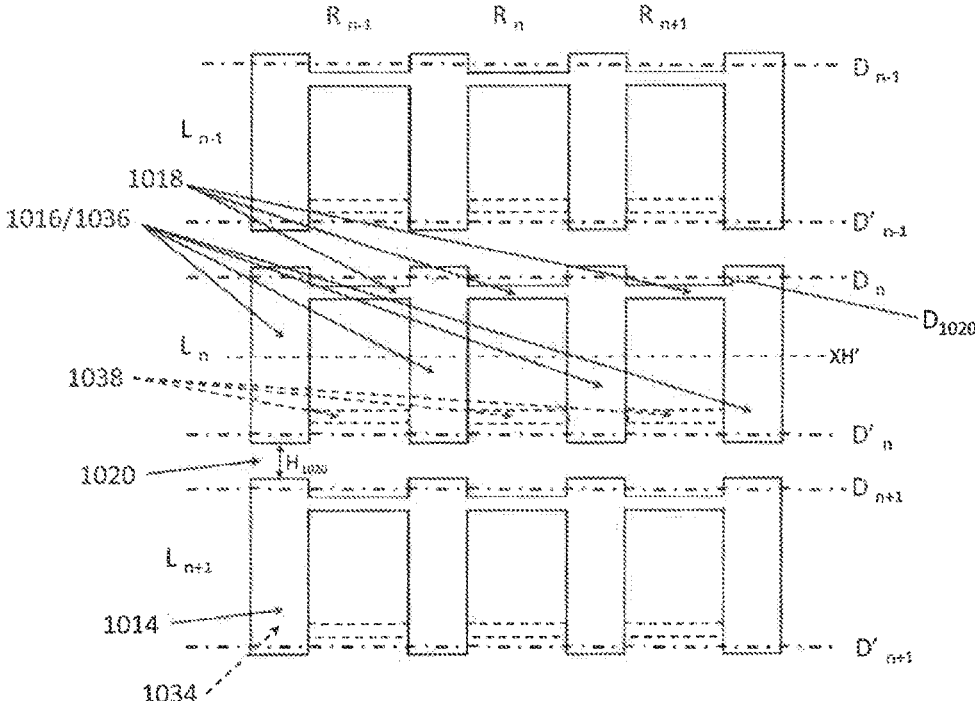
FIG. 14 is an overhead view showing, at a larger scale, the cuts made along H-shaped grooves according to the second alternative embodiment of the invention.

For this purpose, with reference to FIG. 14, three lines Ln−1 to Ln+1 and three rows Rn−1 to Rn+1 have been shown. According to the invention, two cuts Dn and D'n are made per line of grooves. Each cut, which is made in a penetrating manner, i.e. it extends through the entire height of the stack, is made in a manner known per se. Non-limiting examples include cutting by sawing, in particular cutting into cubes, guillotine cutting or laser cutting.

Each cut is made between a respective channel and the end facing the H. It is assumed that the thickness of said cut is disregarded. The cuts are made through both the anodes and cathodes, i.e. at a distance D1020 from the channels of the H-shaped grooves so as to have, for each cathode 1110, respectively each anode 1130, of the battery 1100, a primary body 1111, respectively 1131, separated from a secondary body 1112, respectively 1132, by a space free of any electrode material, electrolyte and/or current-collecting substrate 1113, respectively 1133, as shown in FIG. 15. This is a particularly advantageous feature of the invention in that it improves the quality of the cut compared to the prior art and prevents short-circuits at the lateral edges of the battery. Each final battery 1100 is delimited, at the top and bottom, by the two cuts and, on the right and left, by the inner faces of the vertical main recesses of the H. In FIG. 13, the batteries 1100, once cut along the cutting lines Dn and D'n, have been hatched, and the zones 1040 of the foils in the stack that do not form the batteries have been shown as dotted, whereas the volume of the grooves has been left blank.

According to the invention, the D'n and Dn cuts are made through the anodes and cathodes of similar density, inducing a high quality, clean cut. Furthermore, the presence of a space free of any electrode material, electrolyte and/or current-collecting substrate prevents any risk of a short-circuit.

As shown in FIG. 15, each cathode 1110 comprises a primary body 1111, a secondary body 1112 situated on a first lateral edge 1101, and a space 1113 free of any electrode material, electrolyte and/or current-collecting substrate. The latter, whose width corresponds to that of the channel 1018 of the groove 1014 described hereinabove, extends between the longitudinal edges. Similarly, each anode 1130 comprises a primary body 1131, as well as a secondary body 1132 situated on the lateral edge 1102, opposite the edge 1101. The primary body 1131 and the secondary body 1132 are separated by a space 1133 free of any electrode material, electrolyte and/or current-collecting substrate, connecting the longitudinal edges, i.e. extending between the longitudinal edges 1103 and 1104. The two free spaces 1113 and 1133 are mutually symmetrical, relative to the median line Y100.

The width L1113 of each free space 1113 corresponds to the width of the channel 1018 belonging to the groove described in the preceding figures. Moreover, the width L1112 of each secondary body 1112 corresponds to the distance D1020, as described hereinabove.

The battery 1100 obtained according to the second alternative embodiment of the invention is identical in all respects to that obtained according to the first alternative embodiment of the invention even though the arrangement of the grooves 1014 is different.

In a third alternative embodiment of the invention, which is not shown in the figures, the H-shaped grooves 14, 1014 can be distributed into lines L1 to Ly, disposed one below the other, and into rows R1 to Rx disposed next to one another. In this way, on the same anode and/or cathode foil, the H-shaped grooves 14, 1014 are disposed according to the first and second alternative embodiment of the invention, on the anode and/or cathode foils, in such a way as to maintain sufficient mechanical stiffness for these foils to be easily handled and for the stack to advantageously be able to define a maximum number of unit batteries.

The battery 1100 obtained according to the third alternative embodiment of the invention is identical in all respects to that obtained according to the first and/or second alternative embodiments according to the invention even though the arrangement of the grooves 14/1014 on the anode and/or cathode foils is different.

Figure 12:
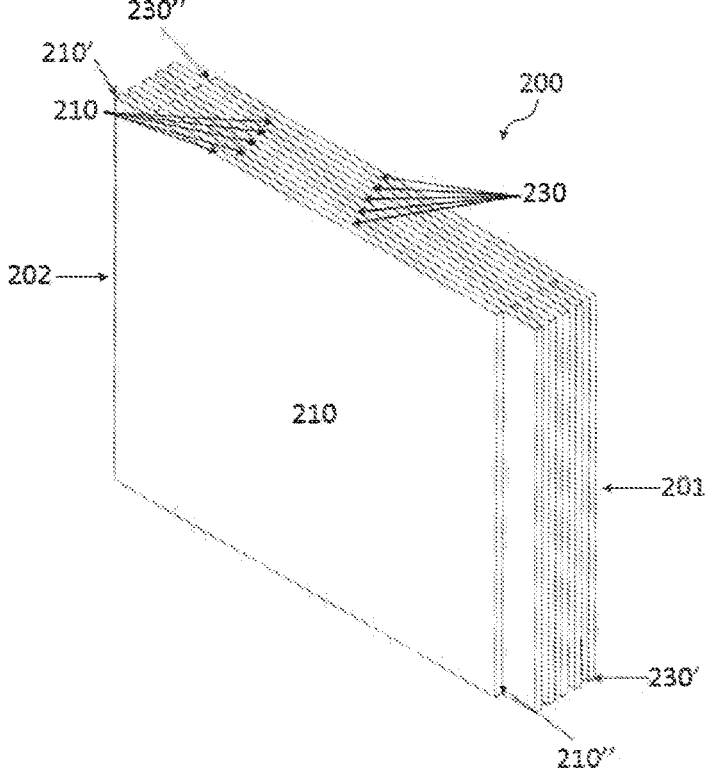
FIG. 12 is a perspective view showing a battery according to the prior art.

A comparison between FIGS. 11 and 12 highlights the advantages of the invention. More specifically, substantially the entire overall volume of the battery is occupied by useful material, i.e. material that contributes to the electrochemical functioning of the battery 100. More specifically, only the two very small free spaces 133, 1133 cannot be considered as useful material. In this respect, with reference to FIG. 10, it can be seen that the free faces 112' of the secondary cathode bodies are flush with the free faces 131' of the primary body of the anodes, whereas the free faces 132' of the secondary anode bodies are flush with the free faces 111' of the primary body of the cathodes. In other words, the opposing lateral edges of the battery according to the invention, comprising electrode materials, are substantially continuous compared to those of the prior art shown in FIG. 12, which are discontinuous due to the presence of set-back regions.

The "free face of the secondary body" corresponds to the face belonging to the secondary body that is opposite the primary body. The "free face of the primary body" corresponds to the face belonging to the primary body that is opposite the secondary body.

With reference to FIG. 10, the following should be noted:
the first through-hole 51 made in the primary body of the cathode extends in the continuation of the second through-hole 54 made in the secondary body of the anode, such that these holes 51, 54 extend in the continuation of one another, and form a first through-passage 61 which passes through the battery from end to end, and the first through-hole 53 made in the primary body of the anode extends in the continuation of the second through-hole 52 made in the secondary body of the cathode, such that these holes 53, 52 extend in the continuation of one another, and form a second through-passage 63 which passes through the battery from end to end.

Advantageously, the second through-hole 52 is made in the secondary body of the cathode, at a certain distance D57 from the free space 113 (corresponding to the channel 18 of the groove 14) in order to prevent any risk of a short-circuit. In an identical manner, the second through-hole 54 is made in the secondary body of the anode, at a certain distance D59 from the free space 133 (corresponding to the channel 38 of the groove 34) in order to prevent any risk of a short-circuit.

Advantageously, the first and second through-holes 53, 52, 51, 54 are made at a certain distance from the lateral edges 101 and 102 of the battery, delimiting a band of material 56, 57, 58, 59.

The following denotations are given:

D56 is the width of the band of material 56, which corresponds to the distance between the free face 111' of the battery 100 according to the invention and the face opposite the first through-hole 51 made in the primary body of the cathode; this distance D56 is comprised between 0.04 mm and 1.95 mm, with the understanding that this distance D56 is substantially equal to the distance D59, and is less than the width of the secondary anode body;

D57 is the width of the band of material 57, which corresponds to the distance between the free face 112' of the battery 100 according to the invention and the face opposite the second through-hole 52 made in the secondary body of the cathode; this distance D57 is comprised between 0.04 mm and 1.95 mm, with the understanding that this distance D57 is substantially equal to the distance D58, and is less than the width of the secondary cathode body;

D58 is the width of the band of material 58, which corresponds to the distance between the free face 131' of the battery 100 according to the invention and the face opposite the first through-hole 53 made in the primary body of the anode; this distance D58 is comprised between 0.04 mm and 1.95 mm, with the understanding that this distance D58 is substantially equal to the distance D57;

D59 is the width of the band of material 59, which corresponds to the distance between the free face 132' of the battery 100 according to the invention and the face opposite the second through-hole 52 made in the secondary body of the anode; this distance D59 is comprised between 0.04 mm and 1.95 mm, with the understanding that this distance D59 is substantially equal to the distance D56.

The first and second passages 61, 63 made in the battery according to the invention are filled with conductive means for making the electrical connection between the cells of the battery as shown in FIGS. 16A, 16B, and 16C. These conductive means project from the top and bottom surfaces of the battery.

The conductive means can be obtained from electrically conductive materials. Advantageously, the WVTR of these conductive means is extremely low; these conductive means are impervious. They are in intimate contact with the electrical connection zones of the stack.

By way of example, the conductive means can be:

a bar made of an electrically conductive material, such as a conductive glass or a metal inserted in the molten state or by any suitable means into the passage. When solidified, this material forms the aforementioned bar, the two opposite ends whereof preferably define fastening heads as shown in FIG. 16A, a tight fit metal rod, the two opposite ends whereof preferably define fastening heads, as shown in FIG. 16B, a metal rod surrounded by an electrically conductive sheath material, the sheath being obtainable from a glass or a metal inserted in the molten state or by any suitable means into the passage. When solidified, this material forms the aforementioned metal rod surrounded by an electrically conductive sheath, the two opposite ends whereof preferably define fastening heads as shown in FIG. 16C.

The top of each of these fastening heads or each of the opposing ends of the conductive means can define an electrical connection zone, i.e. an anode connection zone 75, 75' or cathode connection zone 76, 76' of the battery according to the invention, such that the battery comprises at least one anode connection zone 75, 75' and at least one cathode connection zone 76, 76'.

The conductivity of the conductive glass can be obtained by adding particles of gold, nickel, chromium, nickel-chromium alloy, tungsten, molybdenum, graphite, carbides or nitrides to the glass.

These electrical connections are impervious and have a low water vapour transmission rate (WVTR, also referred to as water vapour permeance). This rate depends in particular on the materials used and the manner in which they are manufactured. The water vapour permeability or permeance can be measured using a method that is the object of the U.S. Pat. No. 7,624,621 and that is also described in the publication "Structural properties of ultraviolet cured polysilazane gas barrier layers on polymer substrates" by A. Mortier et al. published in Thin Solid Films 6+550 (2014) 85-89. The lower the WVTR, the more impervious the encapsulation system.

The "free face of the secondary body" corresponds to the face belonging to the secondary body that is opposite the primary body. The "free face of the primary body" corresponds to the face belonging to the primary body that is opposite the secondary body.

Moreover, the presence of free spaces in each anode layer and respectively cathode layer of the battery does away with the need to use any encapsulation system, i.e. any insulating material, such as parylene, within the battery, as these free spaces act as electrical insulators. This facilitates the final steps in the manufacture of the batteries, such as encapsulation. It is no longer necessary, as in the prior art and shown in FIG. 12, to insulate the set-back regions 210", 230" within the battery, i.e. to fill the gaps in the structure of the prior art with an encapsulation system, and to fill the space present in the U-shaped cuts positioned head-to-tail and offset with an encapsulation system to prevent any short-circuits. The use of a stiff structure according to the invention, together with the use of foils bearing H-shaped cuts, facilitates the encapsulation and reduces the encapsulation thicknesses compared to the prior art. Encapsulation systems of the multilayer type with thinner and stiffer layers than those of the prior art can be considered.

Advantageously, after the step of stacking the anode and cathode foils, the stack obtained is assembled by heat treatment and/or mechanical compression.

Advantageously, after the step of stacking the anode and cathode foils, the heat treatment of the stack, allowing the battery to be assembled, is carried out at a temperature comprised between 50° C. and 500° C., preferably at a temperature below 350° C., and/or the mechanical compression of the stack of the anode and cathode foils to be assembled is carried out at a pressure comprised between 10 and 100 MPa, preferably between 20 and 50 MPa. In one specific embodiment, after the stacking and heat treatment step thereof, the first through-passage 61 and the second through-passage 63 are advantageously produced as indicated hereinabove, then a cathode conductive means 71, 71', 71" is inserted into the first through-passage 61 and an anode conductive means 73, 73', 73" is inserted into the second through-passage 63, each of these conductive means being capable of collecting at least a part of the battery current.

In any case, these anode and cathode conductive means project from the opposing surfaces of the stacked anode and cathode foil structure; these conductive means thus protrude from the overall volume of the stack as shown in FIGS. 16A, 16B, and 16C.

The stack of anode and cathode foils, comprising anode and cathode conductive means, is then cut by any suitable means along the cutting lines D'n and Dn so as to obtain unit batteries.

In the case of batteries impregnated with a liquid electrolyte, the impregnation of the battery with a liquid electrolyte is advantageously carried out after producing the ionic conductive means, by a phase carrying lithium ions such as an ionic liquid and/or a mixture of ionic liquids with or without a solvent and containing a lithium salt; this phase carrying lithium ions penetrates the battery by capillarity. Impregnation can be carried out using techniques known per se.

After the conductive means have been formed, or in the case of batteries impregnated with a liquid electrolyte, after the battery has been impregnated with a lithium ion carrier phase, the stack is advantageously encapsulated by depositing an encapsulation system to protect the battery cell from the atmosphere. The encapsulation system must be chemically stable, able to withstand a high temperature and impermeable to the atmosphere to fulfil its function as a barrier layer. Advantageously, the stack of anode and cathode foils according to the invention can be covered with a sequence, preferably z sequences, of an encapsulation system comprising: a first cover layer, preferably selected from parylene, parylene F, polyimide, epoxy resins, silicone, polyamide and/or a mixture thereof, deposited on the stack of anode and cathode foils, and a second cover layer formed by an electrically insulating material, deposited by atomic layer deposition (ALD) or by plasma-enhanced chemical vapour deposition (PECVD) or by high density plasma chemical vapour deposition (HDPCVD) or by inductively coupled plasma chemical vapour deposition (ICP CVD) on said first cover layer.

This sequence can be repeated z times, where $z \geq 1$. This multi-layer sequence has a barrier effect. The more the sequence of the encapsulation system is repeated, the greater this barrier effect will be. It will increase as the number of thin layers deposited increases.

Typically, the first cover layer is made of a polymer, for example silicone, or epoxy resin, or polyimide, polyamide, or poly-para-xylylene (better known as parylene). This first cover layer protects the sensitive elements of the battery from the environment. This first layer further closes off the porosities in the surface of the stack and creates a uniform adhesion layer for the subsequent layers of the encapsulation system. This layer advantageously covers the six faces of the battery and completely encloses the battery. The thickness of said first cover layer is preferably comprised between 0.5 µm and 50 µm.

Advantageously, the first cover layer can be made from parylene C, parylene D, parylene N (CAS 1633-22-3), parylene F or a mixture of parylene C, D, N and/or F. Parylene (also called polyparaxylylene or poly(p-xylylene)) is a dielectric, transparent, semi-crystalline material with high thermodynamic stability, excellent resistance to solvents and very low permeability. Parylene also has barrier properties to protect the battery from the external environment thereof. The protection of the battery is enhanced when this first cover layer is made from parylene F. This first cover layer is advantageously obtained from the condensation of gaseous monomers deposited by chemical vapour deposition (CVD) on the surfaces, which results in a conformal, thin and uniform covering of all of the accessible surfaces of the stack. This first cover layer is advantageously stiff; it cannot be considered to be a flexible surface. Since this first cover layer is not sufficiently impervious (in terms of water vapour permeance), at least one second cover layer made of an electrically insulating material, preferably with low water vapour permeance, should be deposited on this first cover layer.

The second cover layer is formed by an electrically insulating material, preferably an inorganic material. It is advantageously deposited by atomic layer deposition (ALD), so as to obtain a conformal covering of all of the accessible surfaces of the stack previously covered with the first cover layer. The layers deposited by ALD are mechanically very fragile and require a stiff bearing surface to fulfil their protective role. The deposition of a fragile layer on a flexible surface would result in the formation of cracks, causing this protective layer to lose integrity. Furthermore, the growth of the layer deposited by ALD is influenced by the nature of the substrate. A layer deposited by ALD on a substrate having zones of different chemical natures will have inhomogeneous growth, which can cause this protective layer to lose integrity.

ALD deposition techniques are particularly well suited for covering surfaces with a high roughness in a completely impervious and conformal manner. They allow for the production of conformal layers, free of defects such as holes (so-called "pinhole-free" layers) and represent very good barriers. The WVTR thereof is extremely low. The second cover layer can advantageously be deposited by plasma-enhanced chemical vapour deposition (PECVD) or by chemical vapour deposition of the HDPCVD or ICP CVD type. This second cover layer preferably has a thickness comprised between 10 nm and 10 µm. The thickness of this second layer is advantageously chosen as a function of the desired level of imperviousness to gases, i.e. the desired WVTR, and depends on the deposition technique used, chosen in particular from among ALD, PECVD, HDPCVD and ICP CVD. The second cover layer can be made of a ceramic material, vitreous material or glass-ceramic material, for example in the form of an oxide, of the $Al_2O_3$ or $Ta_2O_5$ type, a nitride, a phosphate, an oxynitride or a siloxane.

This second cover layer deposited by ALD, PECVD, HDPCVD or ICP CVD on the first cover layer firstly makes it possible to render the structure impervious, i.e. to prevent water from migrating inside the object, and secondly makes it possible to protect the first cover layer, which is preferably made of parylene F, from the atmosphere, in particular from air and moisture, and from thermal exposure in order to prevent the degradation thereof. This second cover layer improves the life of the encapsulated battery.

Encapsulating the stack of anode and cathode foils in this sequence of the encapsulation system, preferably in z sequences, allows the WVTR of the encapsulation system to be reduced as far as possible, i.e. it allows the imperviousness of the stack and of the final battery to be increased.

The stack of anode and cathode foils thus encapsulated in this sequence of the encapsulation system, preferably in z sequences, can then be coated with a final cover layer so as to mechanically protect the stack thus encapsulated and optionally give it an aesthetic appearance. This last cover layer protects and improves the life of the battery. Advantageously, this last cover layer is also chosen to withstand high temperatures and has sufficient mechanical strength to protect the battery during the subsequent use thereof. Advantageously, the thickness of this last cover layer is comprised between 1 μm and 50 μm. Ideally, the thickness of this last cover layer is about 10-15 μm, since such a thickness range protects the battery from mechanical damage.

This last cover layer preferably has an epoxy resin, polyethylene naphthalate (PEN), polyimide, polyamide, polyurethane, silicone, sol-gel silica or organic silica base. Advantageously, this last cover layer is deposited by dip coating.

Alternatively, the encapsulation system for protecting the battery cell, or the stack of anode and cathode foils according to the invention, from the atmosphere can be formed by a sequence, preferably z' sequences, comprising a first alternative cover layer having a very low WVTR, preferably less than $10-5$ g/m2·d. This sequence can be repeated z' times, where z≥1. It has a barrier effect, which increases as the value of z' increases. Encapsulating the stack of anode and cathode foils in this sequence of the encapsulation system, preferably in z' sequences, allows the WVTR of the encapsulation system to be reduced as far as possible, i.e. it allows the imperviousness of the encapsulation to be increased, the imperviousness of the stack to be increased and ultimately the imperviousness of the battery to be increased.

The thickness of said first alternative cover layer is preferably comprised between 0.5 μm and 50 μm.

This alternative cover layer can be formed by a ceramic material and/or a low melting point glass, preferably a glass having a melting point below 600° C., deposited at the outer periphery of the stack of anode and cathode foils. The ceramic and/or glass material used in this layer is advantageously chosen from among:

a low melting point glass (typically >600° C.), preferably $SiO_2$—$B_2O_3$; $Bi_2O_3$—$B_2O_3$, $ZnO$—$Bi_2O_3$—$B_2O_3$, $TeO_2$—$V_2O_5$, $PbO$—$SiO_2$, oxides, nitrides, oxynitrides, $Si_xN_y$, $SiO_2$, SiON, amorphous silicon or SiC.

These glasses can be deposited by moulding or dip coating.

The ceramic materials are advantageously deposited by PECVD or preferably by HDPCVD or ICP CVD at a low temperature; these methods allow a layer with good imperviousness to be deposited.

Advantageously, the alternative encapsulation system can comprise z' alternative cover layers of different natures in order to reduce the WVTR of the encapsulation, i.e. to increase the imperviousness of the stack. By way of example, the encapsulation system can comprise a first layer composed of a ceramic material, a second layer composed of a low melting point glass disposed on the first layer, and vice-versa.

Encapsulation in a glass film can be obtained by depositing an ink comprising oxides, phosphates, borates and/or precursors of a low melting point glass, followed by sintering.

The result is a stiff and impervious encapsulation, which in particular prevents water vapour from passing at the interface between the encapsulation system and the contact members.

After the imperviousness of the battery cell has been ensured via the encapsulation thereof, the electrical connections are exposed at the ends of the conductive means of the battery by any means, including polishing.

Terminations (electrical contacts) are added where the cathode or respectively anode connections are apparent (not coated with an insulating electrolyte). These contact zones are preferably disposed on opposite sides of the stack of the battery to collect the current. The connections are galvanised using techniques known to a person skilled in the art, preferably by immersion in a conductive epoxy resin and/or a bath of molten tin.

The terminations can be made in the form of a single metal layer, for example tin, or made of multi-layers. Preferably, the terminations are constituted, near the cathode and anode connections, by a first stack of layers successively comprising a first layer of conductive polymer, such as a silver-filled resin, a second layer of nickel deposited on the first layer and a third layer of tin deposited on the second layer. The nickel and tin layers can be deposited by electroplating techniques.

In this three-layer complex, the nickel layer protects the polymer layer during the welding assembly steps, and the tin layer ensures the weldability of the battery interface.

The terminations allow positive and negative electrical connections to be made on the top and bottom faces of the battery. These terminations allow parallel electrical connections to be made between the different battery elements. The cathode connections preferably protrude on one lateral side of the battery and the anode connections are preferably available on the other lateral side.

FIGS. 18 to 20 show an alternative embodiment of the battery 100 relative to the first embodiment described hereinabove. In these FIGS. 18 to 20, any mechanical elements similar to those of the first embodiment, are given the same reference numerals incremented by 300.

The final battery according to this alternative embodiment shown in FIGS. 18 to 20, which is given the reference numeral 400, differs from the battery 100 in particular in that the conductive members are not provided at the same location. FIG. 18, which is similar to FIG. 5, shows the arrangement of the H-shaped grooves 334, which are not associated with through-passages such as 61 and 63. More specifically, perforations 361 and 363 are made in the anode and cathode foils. For each H-shaped groove, the perforations 361 form a first row 362 between the recesses 316, 336 of this H. Moreover, the other perforations 363 form a second row 364 between the same recesses 316, 336.

In the example shown, each row 362 and 364 is respectively formed by three perforations. Alternatively, a different number of these perforations can be provided, this number depending in particular on the width of the component. A single perforation can be provided, or conversely, a number of perforations far greater than three can be provided.

Each row of perforations is arranged along a respective cutting line D361 and D363, with these cutting lines passing therethrough. Advantageously, each cutting line passes through the different perforations, crossing the centre of these perforations. In the example shown, each perforation has a circular shape, with a diameter that is typically comprised between 50 μm and 5 mm. As a result, each cutting line forms a diameter of the different perforations through which it passes. Finally, the distance between the edge of each perforation and the opposite wall, either of a recess or of a channel of the groove, will be chosen by a person skilled in the art so as to prevent the foil from unintentionally tearing.

During manufacture, the inner volume of the different perforations is filled with a suitable, conductive material. Examples include a resin, a polymer or even a conductive glass. The cuts D361 and D363 thus produce conductive members 371 and 373, as shown in FIGS. 19 and 20 showing the final battery. The conductive members 371 are formed from the conductive material, which is initially inserted into the perforations 361, whereas the conductive members 373 are formed from the conductive material of the perforations 363.

Since the different foils are cut through the centre of the perforations 361, 363, each conductive member 371, 373 has a substantially semi-cylindrical shape, the diameter whereof corresponds to that of a perforation. This conductive member is received in a through-passage, in the sense given with reference to the first embodiment. Contrary to this first embodiment, this through-passage is not cylindrical, but semi-cylindrical since it corresponds to the shape of the conductive member described hereinabove.

As can be seen in particular in FIG. 19, each lateral edge 401, 402 is formed by an alternation of electrically conductive zones, each formed by a respective conductive member 371, 373, and so-called open stack zones. The latter, which are given the reference numerals 375 and 377, allow for easy impregnation by the electrolyte. It should be noted that, in the embodiment shown in FIGS. 18 to 20, each conductive member is flush with a respective lateral edge 401 and 402, as opposed to the first embodiment wherein the conductive members are situated at a distance from the opposite lateral edge.

There are specific advantages to this embodiment shown in FIGS. 18 to 20. More specifically, each conductive member is formed at the same time as the foils are cut. With this in mind, the perforations, which allow these conductive members to be produced, help facilitate the cutting operations. Moreover, the material making up the conductive member is solidified before filling with the ionic liquid. This guarantees a satisfactory electrical contact.

It should also be noted that each conductive member opens out, on the one hand horizontally onto the lateral edges 401, 402 of the battery, and on the other hand vertically respectively onto the top face 405 and bottom face 406 of this battery. This procures great convenience in terms of recovering the electric current generated. More specifically, this current can be collected either only at the lateral edges, only at the top and bottom faces, or both at these lateral edges and at these opposing faces.

In particular, as shown in FIG. 21, the current can be recovered through a support provided underneath the battery. This support 500, which is generally planar, typically has a thickness of less than 300 μm, preferably less than 100 μm. This support is advantageously made of an electrically conductive material, typically a metal material. In particular, aluminium, copper or stainless steel are chosen, since these materials can be coated with a thin layer of gold, nickel and tin to improve the weldability thereof. The front face of the support is respectively given the reference numeral 510 and faces the anode and cathode layers, and the opposite, rear face is given the reference numeral 520.

This support is perforated, i.e. it has spaces 530 and 540 delimiting a central base plate 550 and two opposite lateral strips 560 and 570. The different regions 550, 560 and 570 of this support are thus electrically insulated from one another. For this purpose, the spaces 530 and 540 are filled with any suitable non-conductive material.

Moreover, the lateral strips 560 and 570 form regions electrically insulated from one another and which are connected to the conductive members 371 and 373 described hereinabove. For this purpose, each conductive member is advantageously fastened to a respective lateral strip by the insertion of a buffer 562, 572 made of an electrically conductive adhesive.

This embodiment provides for an encapsulation system 380 made of any suitable material similar to that of the encapsulation system 80 described hereinabove. In order to guarantee the essential imperviousness criterion, it must be ensured that the components that are potentially detrimental to the correct operation of the battery, cannot access the unit stack of the anodes and cathodes. In other words, according to the invention, this involves preventing any potential "gateway" for the detrimental components thereof.

For this purpose, the encapsulation material 380 firstly covers the lateral edges of the battery, i.e. the conductive members 371 and 373, and the open stack zones 375 and 377. It also advantageously occupies the free spaces 530 and 540 in the support 500. It also fills the intermediate space between, on the one hand the lower face of the unit stack of the anodes and cathodes, and on the other hand the opposite face of the support. Given that this encapsulation is typically carried out in thin layers, generally no thicker than 10 μm, the encapsulation material is found in particular on the various surfaces, which it tends to line. In order to better visualise the filling of the different zones of the battery with this encapsulation material, the reference 380 has been provided multiple times in this FIG. 21.

Finally, it can be seen that, according to one advantageous embodiment of the invention, the battery is further equipped with a stiffening system, denoted as a whole by the reference numeral 390. This stiffening system covers the entire encapsulation system 380, opposite the support 500. Moreover, this stiffening material advantageously occupies all or part, on the one hand, of the free spaces 530 and 540 and on the other hand the intermediate space between the support and the anode and cathode foils. In these different zones, this stiffening material is thus intimately linked to the encapsulation material. This intimate mixture can be found at least on the surfaces since, as shown hereinabove, the encapsulation material is mostly present on these surfaces. The presence of the aforementioned materials ensures that the desired functions are optimised, not only in terms of imperviousness, but also in terms of mechanical stiffness.

This stiffening system 390 can be made of any material, allowing this specific mechanical stiffness function to be provided. With this in mind, a resin can be chosen for example, which can consist of a simple polymer or a polymer filled with inorganic fillers. The polymer matrix can be from the family of epoxies, acrylates or fluorinated polymers for example, and the fillers can be formed by particles, flakes or glass fibres.

Advantageously, this stiffening system 390 can provide an additional moisture barrier function. With this in mind, a low melting point glass can be chosen, thus ensuring the mechanical strength and providing an additional moisture barrier. This glass can be, for example, from the $SiO_2$—$B_2O_3$; $Bi_2O_3$—$B_2O_3$, $ZnO$—$Bi_2O_3$—$B_2O_3$, $TeO_2$—$V_2O_5$ or $PbO$—$SiO_2$ family.

The thickness of the encapsulation system is advantageously very low, in particular less than 50 μm, preferably equal to 20 μm. Typically, the stiffening system is much thicker than the encapsulation system. By way of example, the thickness of this stiffening system is comprised between 50 and 250 μm, and is typically equal to about 100 μm. The presence of an additional stiffening system brings additional advantages, i.e. a mechanical and chemical protection function, optionally combined with an additional gas barrier function.

In operation, electrical energy is generated, conventionally, at the anodes 3 and cathodes 1. This energy is transmitted to the conductive regions 560, 570 of the support 500, via the conductive members 371, 373. Since these conductive regions are insulated from one another, there is no risk of a short-circuit. The electrical energy is then directed from the regions 560 and 570 to an energy-consuming device of any appropriate type.

In FIG. 21, this energy-consuming device is represented diagrammatically and is denoted by the reference numeral 2000. It comprises a body 2002, on which the bottom face of the support rests, an energy-consuming element 2004, and an electrical connection 2006 connecting the bottom face of the support 50 with this element 2004. Control thereof can be provided by any appropriate means, in particular by means of a component, not shown, belonging to the device 2000. Alternatively, this control function can be provided by a component, mounted on the aforementioned support 500.

By way of non-limiting examples, such an energy-consuming device can be an electronic circuit of the amplifier type, an electronic circuit of the clock type (such as a real time clock (RTC) component), an electronic circuit of the volatile memory type, an electronic circuit of the static random access memory (SRAM) type, an electronic circuit of the microprocessor type, an electronic circuit of the watchdog timer type, a component of the liquid crystal display type, a component of the LED (light emitting diode) type, an electronic circuit of the voltage regulator type (such as a low-dropout regulator circuit (LDO)), or an electronic component of the CPU (central processing unit) type.

An alternative embodiment will now be described with reference to FIG. 25, wherein the conductive support 750 is of the multi-layer type, as opposed to the aforementioned support 50, which is of the single-layer type. Furthermore, this support 750 is of the solid type, as opposed in particular to the metal grid hereinabove which is of the perforated type. As shown in this figure, the support 750 is formed by layers, for example made of a polymer material. These layers extend one below the other, the main plane thereof being substantially parallel to the plane of the layers forming the stack of anodes and cathodes. The structure of this support is thus similar to that of a printed circuit board (PCB).

FIG. 25 shows, from top to bottom, a layer 756 on which the stack of the battery will be deposited. This layer 756, which is mainly made of a polymer material, such as epoxy resin, is provided with 2 inserts 757. These are made of a conductive material, in particular a metal material, and are designed to cooperate with the anode and respectively the cathode contacts of the battery. It should be noted that these inserts 757 are insulated from one another, thanks to the epoxy resin of the layer 756.

Immediately below the layer 756 is a layer 758, also made of a polymer material such as an epoxy resin. This layer 758 is provided with 2 inserts 759, made of a conductive material, which are brought into electrical contact with the first inserts 757. As with the layer 756, these inserts 759 are insulated from one another.

A median layer 760 is then present, which is significantly different from the layers 756 and 758 described hereinabove. More specifically, this layer 760 is made of a conductive material, typically similar to that forming the inserts 757 and 759 described hereinabove. This layer is equipped with 2 ring-shaped inserts 761, which are made of an insulating material, in particular an epoxy resin as described hereinabove. These inserts 761 receive, in the hollow central part thereof, discs 762 made of a conductive material, which are placed in contact with the adjacent conductive inserts 759. It should be noted that these conductive discs 762 are insulated from one another via the rings 761.

Finally, the bottom layers 764 and 766 in FIG. 25 are present, which are respectively identical to the layers 758 and 756 described hereinabove. The layer 764 is equipped with 2 inserts 765, in contact with the discs 762, whereas the bottom layer 766 is provided with 2 inserts 767, in contact with the aforementioned inserts 765. The different conductive inserts 757, 759, 762, 765, and 767 define conductive paths denoted by the reference numerals 753, 754, which electrically connect the opposing end faces of the support 705. These paths are insulated from one another, either by the layers 756, 758, 764 and 766 or by the discs 761. In this embodiment, the stiffening system can be different from that 80 of the first embodiment. A protective film 780 can in particular be deposited by means of a lamination step. Such a film, which has barrier properties, is for example made of polyethylene terephthalate (PET) incorporating inorganic multi-layers; such a suitable product is commercially available from the company 3M under the reference Ultra Barrier Film 510 or Ultra Barrier Solar Films 510-F.

FIG. 25 further shows the integration, on an energy-consuming device 2000, of the support 705, the stack 702, the conductive pads 730 and 740, the encapsulation 707 and the film 708. As with the first embodiment, the energy generated at the stack 702 is transmitted, via the contact members 730 and 740, to the upper inserts 757. This energy is then transmitted along the connection paths 753, 754 described hereinabove, to the energy-consuming device 2000.

In the most general structure thereof, the multi-layer support can be formed of only two separate layers, one below the other, which define conductive paths, similar to the conductive paths 753, 754 described hereinabove. This particular embodiment has specific advantages, since the multi-layer substrate such as that denoted by the reference numeral 750 has a very small thickness, advantageously less than 100 μm. Moreover, such a support has a certain flexibility, so that it can accommodate slight changes in the dimensions of the battery, referred to as "breaths" in the introduction to this description. This support further benefits from a particularly satisfactory bending strength, with a view to the integration thereof on a flexible electronic circuit.

According to an additional alternative embodiment, not shown, the alternative embodiment of FIGS. 18 to 20 can be combined with the alternative embodiment of FIGS. 13 and 14. In such a case, perforations are made between each pair of adjacent recesses 1016 belonging to the groove 1014. According to an additional alternative embodiment, not shown, the battery 100 of the first embodiment can be placed on the support 500 shown in FIG. 23.

FIGS. 22 to 24 show an alternative embodiment to the manufacturing method shown with reference to FIG. 18 to 20. It should be noted that the method in FIGS. 22 to 24 produces a battery 400, which is similar to that obtained using the method shown in FIGS. 18 to 20. In FIGS. 22 to 24, the mechanical elements that are similar to those shown in FIGS. 18 to 20, are given the same reference numerals incremented by 300.

As shown in FIGS. 22 and 23, each anode foil 601 and cathode foil 602 has grooves or empty zones, denoted by the reference numerals 614 and 634 respectively, which are elongated and typically I-shaped. With particular reference to FIG. 23, these grooves are distributed into lines L1 to Ln, which are horizontal in this figure, disposed one below the other, as well as into rows R1 to Rm, which are vertical in this figure, disposed next to one another. Adjacent lines are separated by horizontal bridges of material 650, whereas adjacent rows are separated by vertical bridges of material 660. Typically, the width of these different bridges of material is comprised between 0.05 mm and 5 mm. These different bridges of material give the different foils sufficient mechanical stiffness for them to be easily handled.

When viewed from overhead, as shown in FIG. 23, the different cathode grooves 614 are aligned, i.e. superimposed on top of one another. Similarly, the different anode grooves 634 are also aligned. By contrast, the anode and cathode grooves are not aligned in that they are offset from one another. These grooves thus create a plurality of intermediate spaces 635, along which perforations 661 are made. These are typically similar in shape and size to the perforations 361 and 363 in FIGS. 18 to 20. As with the embodiment shown in FIGS. 18 to 20, the perforations 661 receive a material suitable for forming a conductive member 371 or 373.

It is assumed that, as in the above case, the stack formed by the foils 601 and 602 has undergone operations to ensure the overall stability thereof. Then, pairs of so-called pre-cuts are made, one DX whereof can be seen in FIG. 22. More specifically, FIG. 23 shows a plurality of these cuts. Each pair of cuts DX1, DX2 or DX3 insulates a given line of batteries from adjacent lines. For this purpose, these cuts are made near the opposing longitudinal ends of each I-shaped groove, i.e. near the top and bottom ends respectively thereof in FIG. 23. The number of batteries within a single line corresponds to the number of rows in particular shown in FIG. 22.

Additional so-called main cuts are then made to separate each battery, belonging to a given line, from the batteries adjacent thereto. For this purpose, as shown in FIG. 24, these main cuts DY are made in the intermediate spaces defined hereinabove through the perforations 661. As with the preceding embodiment, each cut preferably extends through the middle of these perforations.

Figure 4:
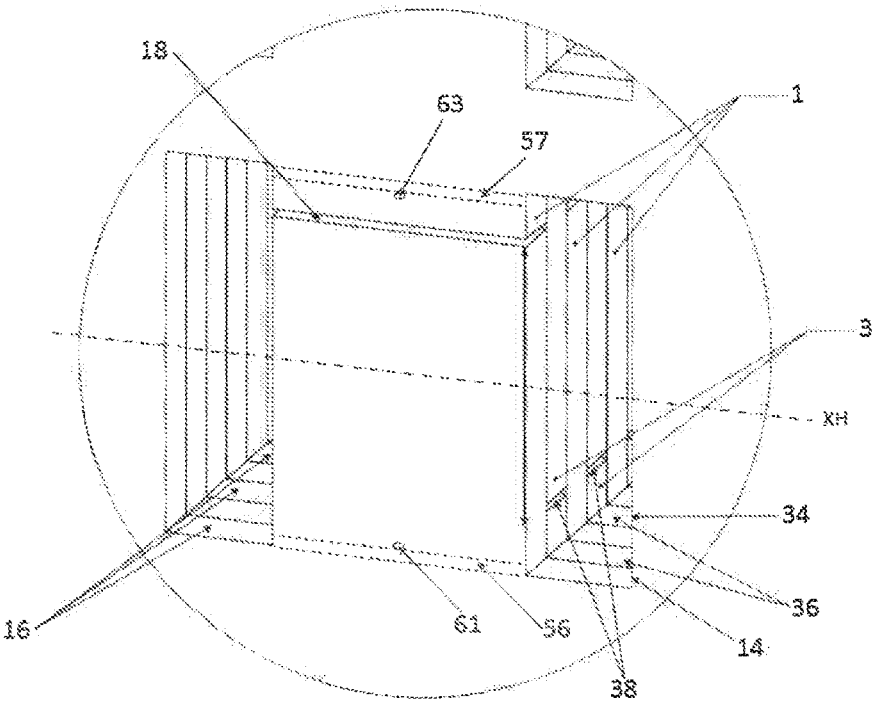
FIG. 4 is a perspective view, also at a large scale, showing these H-shaped grooves made in adjacent foils as well as these first and second passages made in adjacent foils.

After these cuts DY have been made, the different batteries are separated from one another. Moreover, each cut allows two conductive members to be delimited, each of which belongs to a respective battery. In FIG. 4, conductive members belonging to three adjacent batteries 400, 400' and 400" have been referenced. The conductive members 373' and 371 are insulated from one another by the first cut DY, whereas the conductive members 373 and 371" are insulated from one another by the neighbouring cut DY'.

According to an additional alternative embodiment, also not shown, the perforations can be left empty. This possibility has specific advantages in that it improves the cutting operation. More specifically, thanks to the presence of the perforations, this cutting operation is faster. Moreover, the heating of the cutting tools is advantageously reduced.

According to the invention, the battery can comprise any technically compatible combination of the encapsulation systems as described, of the anode and cathode conductive means and of the terminations.

The battery according to the invention can be a lithium-ion microbattery, a lithium-ion mini-battery, or a high-power lithium-ion battery. In particular, it can be designed and dimensioned to have a capacity of less than or equal to about 1 mA h (commonly known as a "microbattery"), to have a power of greater than about 1 mA h up to about 1 A h (commonly known as a "mini-battery"), or to have a capacity of greater than about 1 A h (commonly known as a "high-power battery"). Typically, microbatteries are designed to be compatible with methods for manufacturing microelectronics. The batteries of each of these three power ranges can be produced:

with layers of the "solid-state" type, i.e. without impregnated liquid or paste phases (said liquid or paste phases can be a lithium-ion conductive medium, capable of acting as an electrolyte), or with layers of the mesoporous "solid-state" type, impregnated with a liquid or paste phase, typically a lithium-ion conductive medium, which spontaneously penetrates the layer and no longer emerges therefrom, so that the layer can be considered to be quasi-solid, or with impregnated porous layers (i.e. layers with a network of open pores which can be impregnated with a liquid or paste phase, which gives these layers wet properties).

What is claimed is:

1. A battery, comprising:

at least one anode that includes a current-collecting substrate, at least one anode layer, and a layer of an electrolyte material or a separator impregnated with an electrolyte;

at least one cathode that includes a current-collecting substrate, at least one cathode layer, and a layer of an electrolyte material or of a separator impregnated with an electrolyte;

lateral edges including at least one anode connection zone and at least one cathode connection zone laterally opposite the anode connection zone;

longitudinal edges opposed to one another, wherein:

the at least one anode and the at least cathode are alternately disposed one above the other to form a unit stack successively formed by at least one anode layer, at least one layer of the electrolyte material or the separator impregnated with an electrolyte, and at least one cathode layer, each anode in the at least one anode and each cathode in the at least one cathode having a primary body separated from a secondary body by a space that is free of any electrode material, and current-collecting substrate, said space connecting the opposing longitudinal edges, each anode and each cathode includes, when viewed from overhead, at least one first through-hole made in the primary body and one second through-hole made in the secondary body, each first through-hole made in the primary body of the cathode extends in continuation of each second through-hole made in the secondary body of the anode so as to form a first through-passage which passes through the battery from end to end, and each first through-hole made in the primary body of the anode extends in the continuation of each second through-hole made in the secondary body of the cathode so as to form a second through-passage which passes through the battery from end to end, at least one cathode conductor received in said first through-passage to collect at least a part of the battery current flowing towards at least one cathode connection zone; and at least one anode conductor received in said second through-passage to collect at least a part of the battery current flowing towards at least one anode connection zone.

2. The battery of claim 1, wherein each said first through-passage and each said second through-passage extends at a distance from an opposing lateral edge.

3. The battery of claim 1, wherein:

a shortest distance separating each said first through-passage and said opposing lateral edge is between 0.04 mm and 1.95 mm, and a shortest distance separating each said second through-passage and said opposing lateral edge is between 0.04 mm and 1.95 mm.

4. The battery of claim 1, wherein:

each said first through-passage is made directly in said lateral edge, each said second through-passage is made directly in said lateral edge, and the at least one cathode conductor or the at least one anode conductor is flush with said lateral edge and has a shape of a half-cylinder.

5. The battery of claim 1, wherein:

the at least one cathode conductor is a bar made of an electrically conductive material, a tight fit metal rod, a metal rod surrounded by an electrically conductive sheath material, the at least one anode conductor is a bar made of an electrically conductive material, a tight fit metal rod, a metal rod surrounded by an electrically conductive sheath material, and opposite ends of either said bar or of said metal rod define fastening heads.

6. The battery of claim 5, further comprising:

an electrical connection support made at least in part from a conductive material;

an electrical insulator enabling two distant regions of the electrical connection support to be insulated from one another, these distant regions forming respective electrical connection paths in a manner such that said at least one cathode conductor is brought into electrical contact with a first electrical connection path and said at least one anode conductor is brought into electrical contact with the second electrical connection path.

7. The battery of claim 6, wherein the electrical connection support is a single-layer metal grid or a single-layer silicon interlayer.

8. The battery of claim 6, wherein the electrical connection support comprises a multi-layered printed circuit board type having a plurality of layers disposed one below the other.

9. The battery of claim 1, wherein free faces of the secondary bodies respectively of the at least one cathode and the at least one anode which are opposite the free space, are flush with the free faces of the primary body respectively of the at least one cathode and the at least one anode.

10. The battery of claim 1, further comprising an encapsulation system coating four of six faces of said battery, and partially coating the other two faces that are opposite and substantially perpendicular to the first through-passage and the second through-passage, the encapsulation system including:

at least one first cover layer deposited on the battery, the at least one first cover layer being chosen from a group consisting of parylene, parylene F, polyimide, epoxy resins, silicone, polyamide, sol-gel silica, organic silica and/or a mixture thereof, at least one second cover layer deposited by atomic layer deposition or PECVD, HDPCVD or ICP CVD on said at least one first cover layer, the at least one first cover layer being composed of an electrically insulating material, wherein a sequence of the at least one first cover layer and the at least one second cover layer is repeated z times, where z≥1.

11. The battery of claim 1, further comprising a termination system covering at least the at least one anode connection zone and the at least one cathode connection zone, the termination system successively comprising:

a first layer composed of a conductive polymer, a second layer composed of nickel disposed on the first layer, and a third layer composed of tin, disposed on the second layer.

12. A method of manufacturing batteries, the method comprising:

supplying a stack of alternating anode foils and cathode foils, each anode foil and each cathode foil having a primary body separated from a secondary body by a space that is free of any electrode material, and current-collecting substrate, each anode foil forming an anode layer of a plurality of batteries and includes at least one anode groove devoid of any anode to delimit at least a part of the space that is free of any electrode material, and current-collecting substrate, each cathode foil forming a cathode layer of the plurality of batteries and includes at least one cathode groove devoid of any cathode to delimit at least a part of the space that is free of any electrode material, electrolyte, and current-collecting substrate;

heat treating and/or mechanically compressing the stack;

producing, for each anode layer and each cathode layer, at least one first through-hole in the primary body and at least one second through-hole in the secondary body in a manner such that said first through-hole made in the primary body of the cathode extends in continuation of the second through-hole made in the secondary body of the anode to thereby form a first through-passage which passes through the battery from end to end, and such that said first through-hole made in the primary body of the anode extends in continuation of the second through-hole made in the secondary body of the cathode to form a second through-passage which passes through the battery from end to end;

inserting a cathode conductor into the first through-passage to collect at least a part of the battery current and an anode conductor into the second through-passage to collect at least a part of the battery current;

making cuts to the stack to insulate a given battery in the plurality of batteries.

13. The method of claim 12, wherein:

said at least one anode groove and said at least one cathode groove respectively comprise two longitudinal parts at least partly superimposed to delimit longitudinal edges of each battery, and a lateral part connecting said two longitudinal parts, the lateral part of the at least one anode groove and the lateral part of the at least one cathode groove being offset from one another,
a first cut extends between the lateral part of the anode groove and an end facing the longitudinal parts,
a second cut extends between the lateral part of the cathode groove and an end facing the longitudinal parts.

14. The method of claim 13, wherein:
said at least one anode groove and said at least one cathode groove respectively have an H-shape with the longitudinal parts forming the vertical main recesses of the H and the lateral part forms the channel of the H.

15. The method of claim 13, wherein:
said at least one anode groove and said at least one cathode groove respectively have an I-shape, each anode groove in said at least one anode groove being superimposed on top of one another and each cathode groove in said at least one cathode groove being superimposed on top of one another,
said at least one anode groove being offset relative to said at least one cathode groove to define a plurality of intermediate spaces,
said cuts being made in said intermediate spaces.

16. The method of claim 12, further comprising, after heat treating and/or mechanically compressing the stack or after making the cuts, impregnating the stack with phase-carrying lithium ions.

17. The method of claim 16, wherein said phase-carrying lithium ions comprise liquid electrolytes or an ionic liquid containing lithium salts.

18. The method of claim 12, further comprising, after making the cuts or after impregnating the stack with phase-carrying lithium ions, encapsulating the cut stack by depositing:
at least one first cover layer on each battery, the at least one first cover layer being chosen from a group consisting of parylene, parylene F, polyimide, epoxy resins, silicone, polyamide, sol-gel silica, organic silica and/or a mixture thereof, and then
by atomic layer deposition or PECVD, HDPCVD or ICP CVD, at least one second cover layer on said at least one first cover layer, the at least one second cover layer being composed of an electrically insulating material,
wherein a sequence of the at least one first cover layer and the at least one second cover layer is repeated z times, where z≥1.

19. The method of claim 12, wherein the cuts are made through all of the anodes and the cathodes.

20. An electric energy-consuming device, comprising:
a body; and

32 a battery to supply electric energy to said electric energy-consuming device, the battery including:
at least one anode that includes a current-collecting substrate, at least one anode layer, and a layer of an electrolyte material or a separator impregnated with an electrolyte;
at least one cathode that includes a current-collecting substrate, at least one cathode layer, and a layer of an electrolyte material or of a separator impregnated with an electrolyte;
lateral edges including at least one anode connection zone and at least one cathode connection zone laterally opposite the anode connection zone;
longitudinal edges opposed to one another,
wherein:
the at least one anode and the at least cathode are alternately disposed one above the other to form a unit stack successively formed by at least one anode layer, at least one layer of the electrolyte material or the separator impregnated with an electrolyte, and at least one cathode layer,
each anode in the at least one anode and each cathode in the at least one cathode having a primary body separated from a secondary body by a space that is free of any electrode material, and current-collecting substrate, said space connecting the opposing longitudinal edges,
each anode and each cathode includes, when viewed from overhead, at least one first through-hole made in the primary body and one second through-hole made in the secondary body,
each first through-hole made in the primary body of the cathode extends in continuation of each second through-hole made in the secondary body of the anode so as to form a first through-passage which passes through the battery from end to end, and
each first through-hole made in the primary body of the anode extends in the continuation of each second through-hole made in the secondary body of the cathode so as to form a second through-passage which passes through the battery from end to end,
at least one cathode conductor received in said first through-passage to collect at least a part of the battery current flowing towards at least one cathode connection zone;
at least one anode conductor received in said second through-passage to collect at least a part of the battery current flowing towards at least one anode connection zone; and
an electrical connection support, fastened to said body.

* * * * *